US012621351B2

(12) United States Patent
Jain et al.

(10) Patent No.: US 12,621,351 B2
(45) Date of Patent: May 5, 2026

(54) SECURE CONDITIONAL DOMAIN NAME SYSTEM OPERATION

(71) Applicant: Microsoft Technology Licensing, LLC, Redmond, WA (US)

(72) Inventors: Ashish Jain, Bellevue, WA (US); Shyamshankar Dharmarajan, Los Altos, CA (US); Avraham Carmon, Hofit (IL); Murali Krishna Sangubhatla, Fremont, CA (US); Andrey Terentyev, Pleasanton, CA (US); Rupa Paramasivan, Sammamish, WA (US); Sinead O'Donovan, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 140 days.

(21) Appl. No.: 18/384,780

(22) Filed: Oct. 27, 2023

(65) Prior Publication Data

US 2025/0141926 A1     May 1, 2025

(51) Int. Cl.
*H04L 9/40*          (2022.01)
*H04L 61/4511*     (2022.01)

(52) U.S. Cl.
CPC .......... *H04L 63/20* (2013.01); *H04L 61/4511* (2022.05); *H04L 63/083* (2013.01)

(58) Field of Classification Search
CPC ... H04L 63/20; H04L 61/4511; H04L 63/083; H04L 61/58; H04L 63/0807
See application file for complete search history.

(56) References Cited

U.S. PATENT DOCUMENTS

| | | | |
|---|---|---|---|
| 9,740,781 B2 * | 8/2017 | Statia .................... | G06F 16/951 |
| 9,973,590 B2 * | 5/2018 | Wu ........................ | H04L 67/568 |
| 10,721,117 B2 * | 7/2020 | Kaliski, Jr. ......... | H04L 61/4511 |
| 11,025,482 B2 * | 6/2021 | Huque ................ | H04L 61/5076 |

(Continued)

OTHER PUBLICATIONS

"What Is Zero Trust Network Access (ZTNA)?", retrieved from << https://www.vmware.com/topics/glossary/content/zero-trust-network-access-ztna.html#:~:text=Zero%20Trust%20Network%20Access%20(ZTNA)%20is%20an%20IT%20security%20solution,clearly%20defined%20access%20control%20policies. >>, no later than Oct. 3, 2023, 2 pages.

(Continued)

*Primary Examiner* — Jimmy H Tran

(57)          ABSTRACT

Some embodiments enhance the security of domain name resolution and other DNS operations, by automatically intercepting the DNS operation, determining an associated device identity or ascertaining an associated user identity, and enforcing a security policy based on at least the DNS operation and based on at least one of the identities. Some securable DNS operations include resolution requests, reverse lookups from IP addresses to domain names, DNS record accesses, mail server mappings, redirection, forwarding, and DNS record cache operations. Enforcing the policy includes, e.g., preventing a result requested by the DNS operation, permitting computational progress toward the requested result, allowing a different result, modifying a DNS record, or flushing a DNS record from a cache. In some embodiments, DNS operation security functionality utilizes or implements a conditional access security functionality, thereby providing, e.g., a secure conditional domain name resolution.

20 Claims, 3 Drawing Sheets

500

(56)  References Cited

U.S. PATENT DOCUMENTS

| | | | | |
|---|---|---|---|---|
| 11,032,127 | B2 * | 6/2021 | Huque | H04L 41/0654 |
| 11,216,514 | B2 * | 1/2022 | Statia | H04L 61/4511 |
| 11,743,107 | B2 * | 8/2023 | Kaliski, Jr. | H04L 69/40 709/245 |
| 12,052,293 | B2 * | 7/2024 | Ahn | H04L 63/102 |
| 2010/0223364 | A1 * | 9/2010 | Wei | H04L 67/1097 718/1 |
| 2011/0202793 | A1 * | 8/2011 | Xu | H04L 61/4511 714/48 |
| 2012/0303808 | A1 * | 11/2012 | Xie | H04L 63/0236 709/225 |
| 2014/0089661 | A1 * | 3/2014 | Mahadik | H04L 9/0643 713/162 |
| 2014/0195604 | A1 * | 7/2014 | Wyatt | H04W 4/60 709/203 |
| 2015/0074407 | A1 * | 3/2015 | Palmeri | H04L 67/1095 713/171 |
| 2015/0188949 | A1 * | 7/2015 | Mahaffey | H04W 12/37 726/1 |
| 2015/0199430 | A1 * | 7/2015 | Statia | H04L 63/0236 707/770 |
| 2016/0261625 | A1 * | 9/2016 | Srinivasan | H04L 63/1433 |
| 2017/0063929 | A1 * | 3/2017 | Burbridge | H04L 63/0876 |
| 2017/0155645 | A1 * | 6/2017 | Wu | H04L 61/4511 |
| 2017/0329850 | A1 * | 11/2017 | Statia | H04L 61/4511 |
| 2018/0077120 | A1 * | 3/2018 | Baughman | H04L 67/563 |
| 2018/0262388 | A1 * | 9/2018 | Johnson | H04W 4/70 |
| 2018/0375713 | A1 * | 12/2018 | Huque | H04L 69/40 |
| 2018/0375714 | A1 * | 12/2018 | Kaliski, Jr. | H04L 61/58 |
| 2018/0375715 | A1 * | 12/2018 | Kaliski, Jr. | H04L 69/40 |
| 2018/0375716 | A1 * | 12/2018 | Huque | H04L 61/4511 |
| 2019/0036708 | A1 * | 1/2019 | Fregly | H04W 4/02 |
| 2020/0014724 | A1 * | 1/2020 | Venkatasubramanian | H04L 61/5007 |
| 2021/0091951 | A1 * | 3/2021 | Wilson | H04L 9/0825 |
| 2021/0234860 | A1 * | 7/2021 | Bansal | H04W 12/37 |
| 2021/0266185 | A1 * | 8/2021 | Konda | H04L 61/4511 |
| 2021/0344651 | A1 * | 11/2021 | Joshi | H04L 12/4641 |
| 2021/0377314 | A1 * | 12/2021 | Miller | H04L 63/20 |
| 2021/0385210 | A1 * | 12/2021 | Olden | H04L 63/0892 |
| 2021/0392048 | A1 * | 12/2021 | Olden | H04L 67/56 |
| 2021/0392111 | A1 * | 12/2021 | Sole | H04L 63/1416 |
| 2022/0028160 | A1 * | 1/2022 | Patel | H04L 9/3228 |
| 2022/0224732 | A1 * | 7/2022 | Buckley | H04L 63/205 |
| 2022/0239696 | A1 * | 7/2022 | Konda | H04L 61/4511 |
| 2022/0286431 | A1 * | 9/2022 | Winn | H04L 61/4511 |
| 2023/0041802 | A1 * | 2/2023 | Richards | H04L 63/1483 |
| 2023/0092902 | A1 * | 3/2023 | Jiang | H04L 9/3297 705/64 |
| 2023/0239283 | A1 * | 7/2023 | Bambenek | H04L 63/20 726/22 |
| 2023/0247003 | A1 * | 8/2023 | Chanak | H04L 9/3226 726/1 |
| 2023/0362050 | A1 * | 11/2023 | Kaliski, Jr. | H04W 24/04 |
| 2023/0362204 | A1 * | 11/2023 | Buck | H04L 63/20 |
| 2023/0421583 | A1 * | 12/2023 | Olden | H04L 63/1416 |
| 2024/0106861 | A1 * | 3/2024 | Ahn | H04L 63/0435 |
| 2024/0106862 | A1 * | 3/2024 | Head | H04L 63/20 |
| 2024/0107294 | A1 * | 3/2024 | Silverlock | H04W 8/26 |
| 2024/0265057 | A1 * | 8/2024 | Kol | G06F 16/958 |
| 2024/0323034 | A1 * | 9/2024 | Kumar | H04L 9/3268 |
| 2024/0348664 | A1 * | 10/2024 | Mohanram | H04L 63/02 |
| 2024/0386098 | A1 * | 11/2024 | Sawant | G06F 21/552 |
| 2025/0023842 | A1 * | 1/2025 | Burugu | H04L 61/58 |
| 2025/0358284 | A1 * | 11/2025 | Konda | H04L 12/4625 |

OTHER PUBLICATIONS

Sinead O'Donovan, "Microsoft Entra Expands into Security Service Edge with Two New Offerings", retrieved from << https://techcommunity.microsoft.com/t5/microsoft-entra-azure-ad-blog/microsoft-entra-expands-into-security-service-edge-with-two-new/ba-p/3847829 >>, Jul. 11, 2023, 10 pages.
"DNS flows", retrieved from << https://doc.sophos.com/central/ZTNA/startup/en-us/setup/DNSFlows/index.html >>, Jun. 13, 2022, 4 pages.
"Moving the U.S. Government Toward Zero Trust Cybersecurity Principles", retrieved from << https://www.whitehouse.gov/wp-content/uploads/2022/01/M-22-09.pdf >>, Jan. 26, 2022, 29 pages.
"Split-horizon DNS", retrieved from << https://en.wikipedia.org/wiki/Split-horizon_DNS >>, May 11, 2023, 3 pages.
"Virtual private network", retrieved from << https://en.wikipedia.org/wiki/Virtual_private_network >>, Oct. 19, 2023, 12 pages.
"Configure authentication session management with Conditional Access", retrieved from << https://learn.microsoft.com/en-us/entra/identity/conditional-access/howto-conditional-access-session-lifetime >>, Oct. 23, 2023, 10 pages.
"Microsoft Defender for Endpoint", retrieved from << https://learn.microsoft.com/en-us/mem/configmgr/protect/deploy-use/defender-advanced-threat-protection >>, Aug. 10, 2023, 19 pages.
"Microsoft Defender for Office 365", retrieved from << https://www.microsoft.com/en-us/security/business/siem-and-kdr/microsoft-defender-office-365 >>, no later than Oct. 24, 2023, 5 pages.
"Microsoft Intune securely manages identities, manages apps, and manages devices", retrieved from << https://learn.microsoft.com/en-us/mem/intune/fundamentals/what-is-intune >>, Sep. 5, 2023, 11 pages.
"Certificate revocation", retrieved from << https://en.wikipedia.org/wiki/Certificate_revocation >>, Sep. 9, 2023, 10 pages.
"Continuous access evaluation", retrieved from << https://learn.microsoft.com/en-us/entra/identity/conditional-access/concept-continuous-access-evaluation >>, Oct. 23, 2023, 12 pages.
International Search Report and Written Opinion received for PCT Application No. PCT/US2024/048043, Nov. 27, 2024, 14 pages.

* cited by examiner

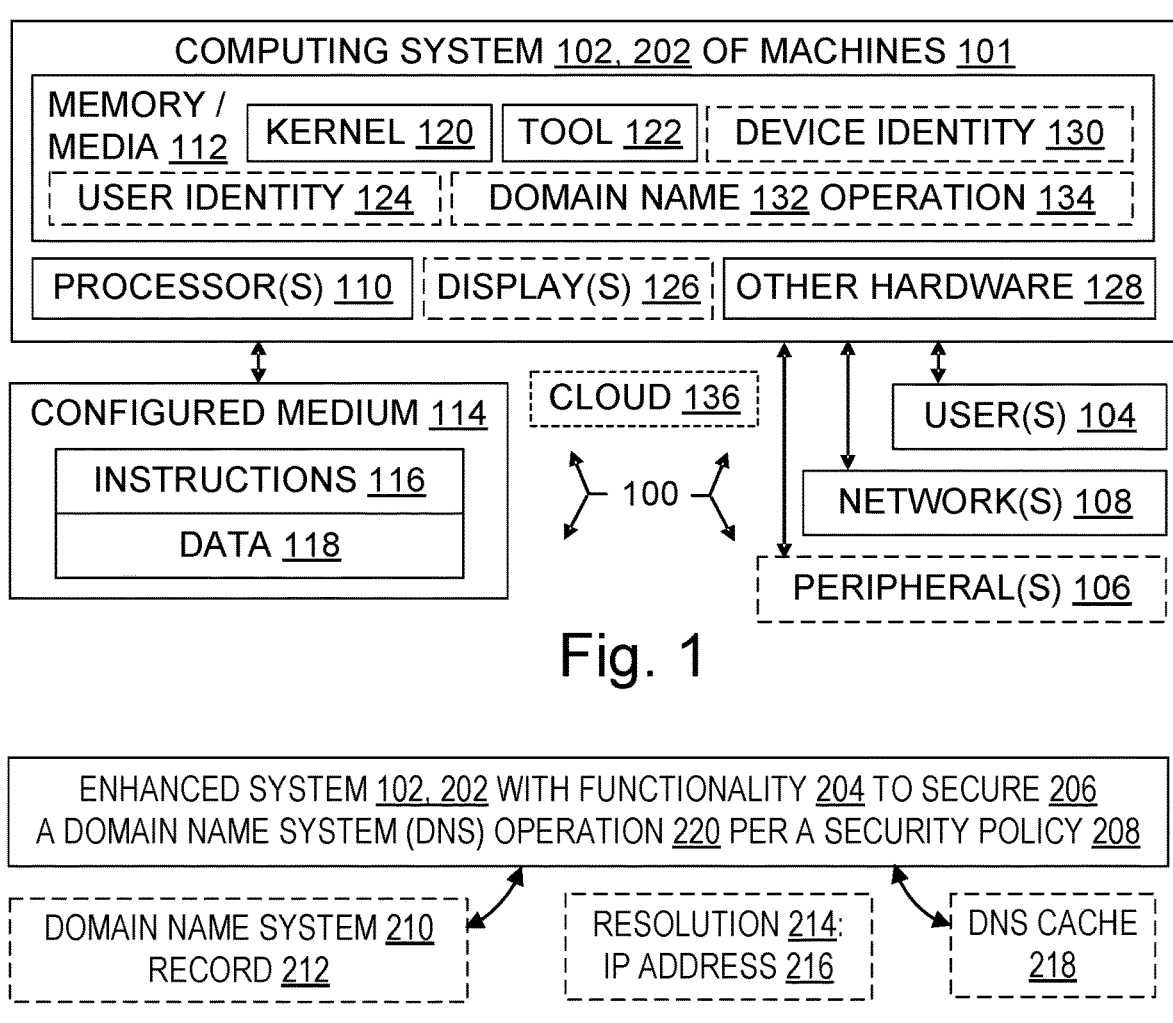

Fig. 1

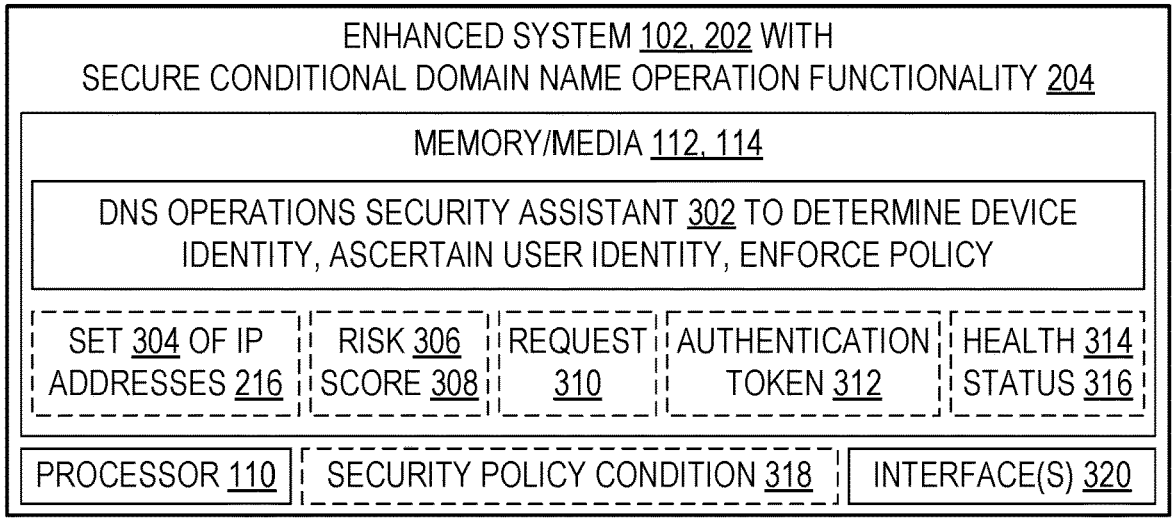

ENHANCED SYSTEM 102, 202 WITH FUNCTIONALITY 204 TO SECURE 206
A DOMAIN NAME SYSTEM (DNS) OPERATION 220 PER A SECURITY POLICY 208

DOMAIN NAME SYSTEM 210
RECORD 212

RESOLUTION 214:
IP ADDRESS 216

DNS CACHE
218

Fig. 2

ENHANCED SYSTEM 102, 202 WITH
SECURE CONDITIONAL DOMAIN NAME OPERATION FUNCTIONALITY 204

MEMORY/MEDIA 112, 114

DNS OPERATIONS SECURITY ASSISTANT 302 TO DETERMINE DEVICE
IDENTITY, ASCERTAIN USER IDENTITY, ENFORCE POLICY

SET 304 OF IP
ADDRESSES 216

RISK 306
SCORE 308

REQUEST
310

AUTHENTICATION
TOKEN 312

HEALTH 314
STATUS 316

PROCESSOR 110     SECURITY POLICY CONDITION 318     INTERFACE(S) 320

Fig. 3

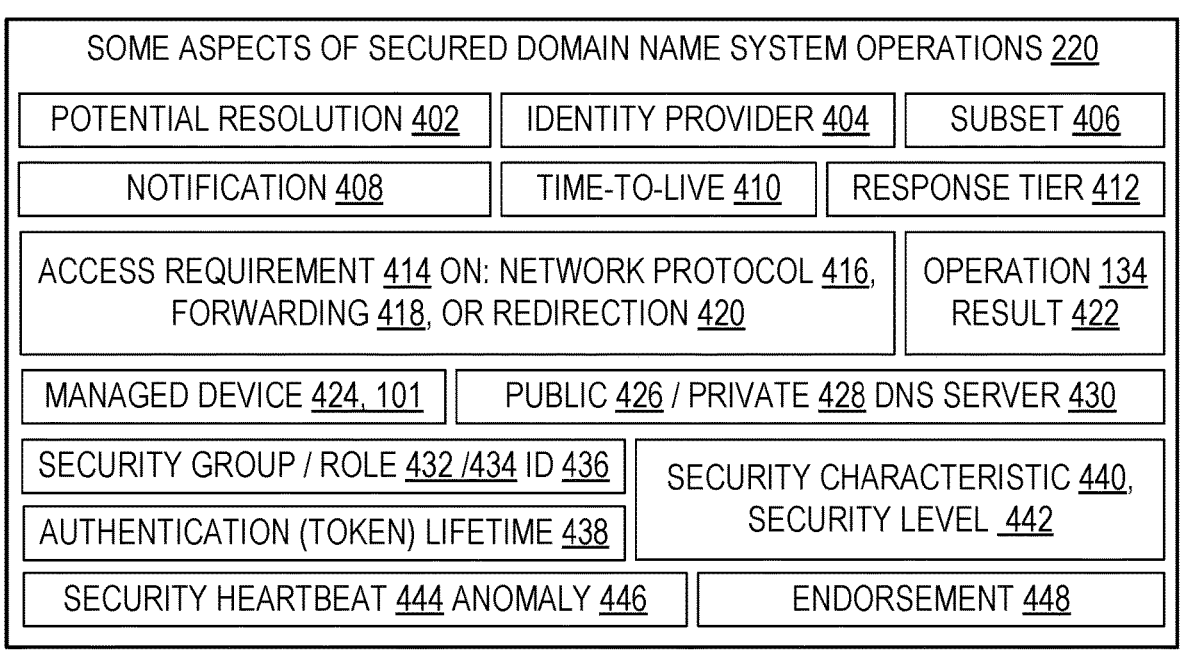

SOME ASPECTS OF SECURED DOMAIN NAME SYSTEM OPERATIONS 220

| POTENTIAL RESOLUTION 402 | IDENTITY PROVIDER 404 | SUBSET 406 |
| --- | --- | --- |
| NOTIFICATION 408 | TIME-TO-LIVE 410 | RESPONSE TIER 412 |

| ACCESS REQUIREMENT 414 ON: NETWORK PROTOCOL 416, FORWARDING 418, OR REDIRECTION 420 | OPERATION 134 RESULT 422 |
| --- | --- |

| MANAGED DEVICE 424, 101 | PUBLIC 426 / PRIVATE 428 DNS SERVER 430 |
| --- | --- |

| SECURITY GROUP / ROLE 432 /434 ID 436 | SECURITY CHARACTERISTIC 440, SECURITY LEVEL 442 |
| --- | --- |
| AUTHENTICATION (TOKEN) LIFETIME 438 | |

| SECURITY HEARTBEAT 444 ANOMALY 446 | ENDORSEMENT 448 |
| --- | --- |

Fig. 4

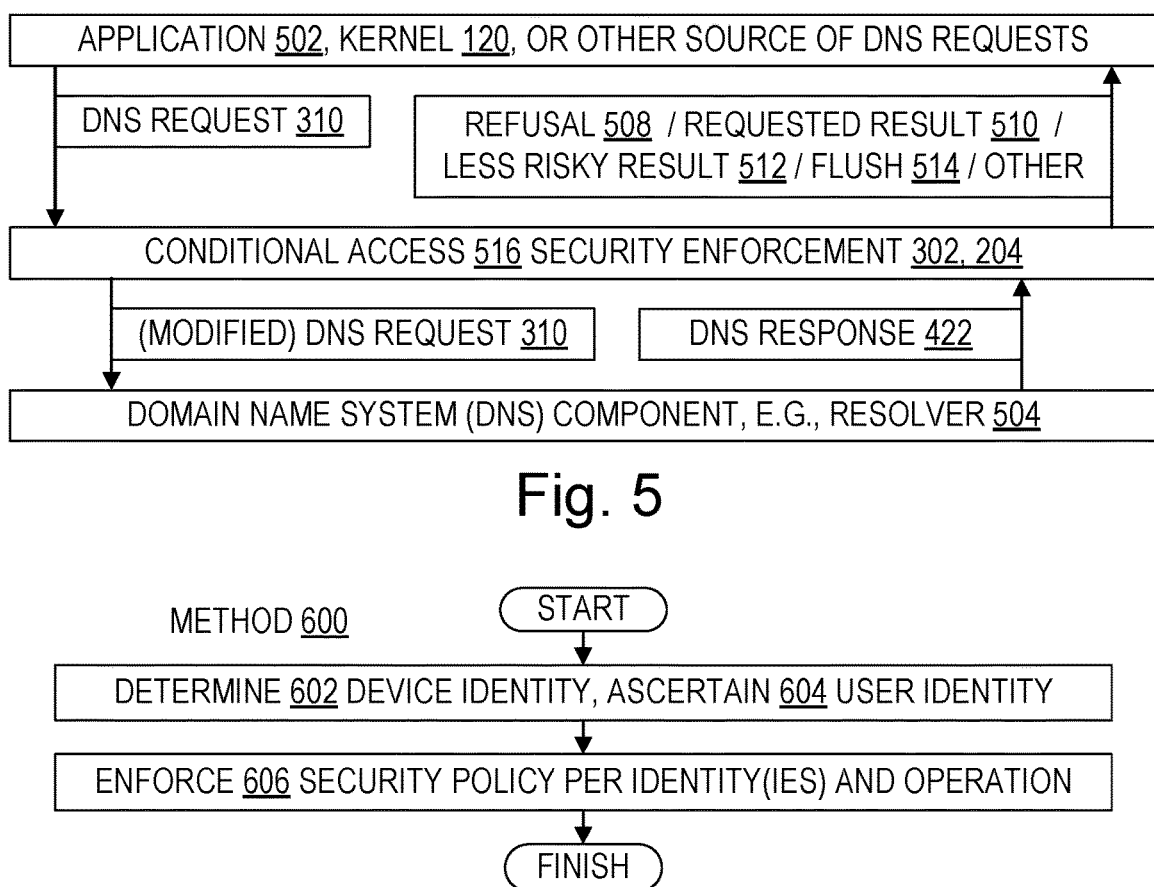

500

APPLICATION 502, KERNEL 120, OR OTHER SOURCE OF DNS REQUESTS

DNS REQUEST 310

REFUSAL 508 / REQUESTED RESULT 510 / LESS RISKY RESULT 512 / FLUSH 514 / OTHER

CONDITIONAL ACCESS 516 SECURITY ENFORCEMENT 302, 204

(MODIFIED) DNS REQUEST 310

DNS RESPONSE 422

DOMAIN NAME SYSTEM (DNS) COMPONENT, E.G., RESOLVER 504

Fig. 5

METHOD 600    START

DETERMINE 602 DEVICE IDENTITY, ASCERTAIN 604 USER IDENTITY

ENFORCE 606 SECURITY POLICY PER IDENTITY(IES) AND OPERATION

FINISH

Fig. 6

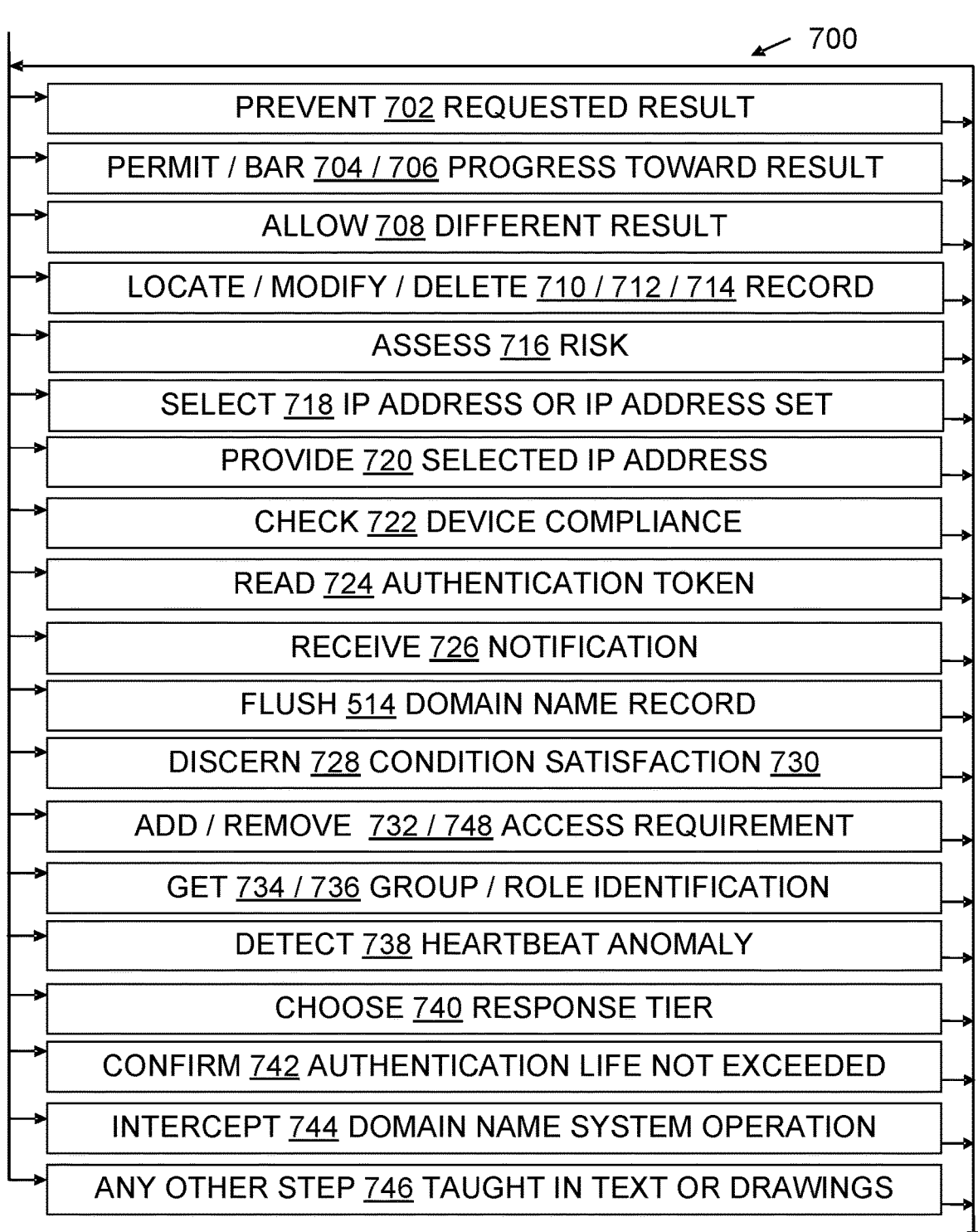

700

PREVENT 702 REQUESTED RESULT

PERMIT / BAR 704 / 706 PROGRESS TOWARD RESULT

ALLOW 708 DIFFERENT RESULT

LOCATE / MODIFY / DELETE 710 / 712 / 714 RECORD

ASSESS 716 RISK

SELECT 718 IP ADDRESS OR IP ADDRESS SET

PROVIDE 720 SELECTED IP ADDRESS

CHECK 722 DEVICE COMPLIANCE

READ 724 AUTHENTICATION TOKEN

RECEIVE 726 NOTIFICATION

FLUSH 514 DOMAIN NAME RECORD

DISCERN 728 CONDITION SATISFACTION 730

ADD / REMOVE  732 / 748 ACCESS REQUIREMENT

GET 734 / 736 GROUP / ROLE IDENTIFICATION

DETECT 738 HEARTBEAT ANOMALY

CHOOSE 740 RESPONSE TIER

CONFIRM 742 AUTHENTICATION LIFE NOT EXCEEDED

INTERCEPT 744 DOMAIN NAME SYSTEM OPERATION

ANY OTHER STEP 746 TAUGHT IN TEXT OR DRAWINGS

Fig. 7

SECURE CONDITIONAL DOMAIN NAME SYSTEM OPERATION

BACKGROUND

The Domain Name System (DNS) associates various pieces of information with identification strings which are known as Uniform Resource Locators (URLs). In particular, the DNS translates between URL domain names and IP addresses in a computing system, such as in the public internet (a.k.a. Internet) or IP addresses in a private network. IP stands for Internet Protocol, which is a widely used computer communications protocol. The DNS has been an important part of the Internet for decades.

Although the DNS is widely used in various versions, and although multiple improvements have been made in the DNS over the years, additional beneficial improvements are still possible.

SUMMARY

Some embodiments described herein address technical challenges arising from cybersecurity weaknesses involving Domain Name System (DNS) operations, such as operations to translate or map a domain name to an IP address. Translation or mapping of a domain name to an IP address is also called "resolution" of the domain name.

In computing systems lacking various security enhancements taught herein, domain name resolution and other DNS operations have been allowed to proceed even when, in hindsight, proceeding conflicts with security goals or other security enforcement measures.

In one scenario, computing system security (a.k.a. cybersecurity) is weakened when an employee still has full access to a confidential internal application even after the employee's account was flagged for unauthorized exfiltration activity. In another scenario, security is weakened when a confidential internal network address is leaked to a public server. In a third scenario, security is weakened when a domain name resolution request from a user account is fulfilled after the authentication lifetime of the user account has expired.

These are merely example scenarios; one of skill will also recognize the applicability of teachings herein to many other scenarios.

Some embodiments enhance the security of domain name resolution and other DNS operations, by automatically intercepting the DNS operation (i.e., intercepting an electronic communication which is a part of the operation), determining a device identity associated with the DNS operation, ascertaining a user identity associated with the DNS operation, and enforcing a security policy against the DNS operation. The enforcing is based on at least the DNS operation and the device identity, or on at least the DNS operation and the user identity, or both. Some examples of DNS operations include resolution requests, reverse lookups which map from IP addresses to domain names, attempts to access a DNS record, mail server mappings, redirection operations, forwarding operations, and operations which access or configure a DNS record cache.

In some embodiments, the enforcing includes at least one of: preventing a result requested by the DNS operation, permitting computational progress toward the result requested by the DNS operation, allowing a different result than the result requested by the DNS operation, modifying a DNS record, or flushing at least a portion of a cache containing at least one DNS record. In some embodiments, enforcing a DNS operation security policy utilizes or implements a conditional access security functionality, thereby providing a secure conditional DNS operation, e.g., a secure conditional domain name resolution.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce-in a simplified form-some technical concepts that are further described below in the Detailed Description. Subject matter scope is defined with claims as properly understood, and to the extent this Summary conflicts with the claims, the claims should prevail.

BRIEF DESCRIPTION OF THE DRAWINGS

A more particular description will be given with reference to the attached drawings. These drawings only illustrate selected aspects and thus do not fully determine coverage or scope.

FIG. 1 is a diagram illustrating aspects of computer systems and also illustrating configured storage media, including some aspects generally suitable for systems which provide domain name system operation security functionality;

FIG. 2 is a block diagram illustrating aspects of a family of enhanced systems which are each configured with domain name system operation security functionality;

FIG. 3 is a block diagram illustrating aspects of another family of systems which are each enhanced with domain name system operation security functionality;

FIG. 4 is a block diagram illustrating some aspects of secured domain name system operations;

FIG. 5 is a data flow diagram illustrating some aspects of domain name system operation security functionality;

FIG. 6 is a flowchart illustrating steps in a domain name system operation security method; and FIG. 7 is a flowchart further illustrating steps in some domain name system operation security methods, and incorporating FIG. 6.

DETAILED DESCRIPTION

Overview

Some teachings described herein were motivated by technical challenges faced during efforts to improve technology for an identity-centric security service edge solution. In particular, technical challenges were faced during development of Microsoft Entra™ SSE (mark of Microsoft Corporation) in the pursuit of better Zero Trust network technology. Some of these technical challenges were motivations for teachings presented herein, but the teachings herein are not limited in their scope or applicability to the particular motivational challenges.

A goal of some Zero Trust networks (ZT networks), which are also referred to as instances of ZTNA architecture (Zero Trust Network Access), is to establish trust by continuous authentication, by checking every network access attempt for correct authorization, and by encrypting every network access attempt. In a ZTNA architecture, no user, or device, or application, is trusted by default—each must establish that its attempted accesses are sufficiently authenticated and authorized under the applicable policies and permissions.

Domain Name System (DNS) capabilities are part of the Internet, and are also part of most if not all private networks. However, DNS was not designed for ZTNA compliance.

One technical challenge of adapting DNS for better ZTNA compliance is how to provide suitable granularity. Some less desirable DNS implementations, for example, follow the same domain name resolution steps for each resolution request originating from any of the users on a given private network. But in at least some secured environments, a finer granularity would delimit differences between users of DNS, if only to permit security tools to define or recognize differences between users.

Another technical challenge of adapting DNS for ZTNA compliance is how to coordinate DNS security-related settings with other security settings. A related challenge is how to define which DNS settings relate to security. For example, determining which DNS settings should be coordinated with user risk scores, and how to coordinate them, are challenges. Some less desirable DNS implementations, for example, would fulfill a domain name resolution request for access to a highly confidential internal website from a given user regardless of whether that user's account was recently flagged for unauthorized exfiltration activity.

Some embodiments described herein address these and other technical challenges. For example, a suitable granularity for DNS operations is provided by determining a device identity associated with the DNS operation, ascertaining a user identity associated with the DNS operation, and enforcing a security policy against the DNS operation. The enforcing is based on at least the DNS operation and the device identity, or on at least the DNS operation and the user identity, or both. Tying the enforcement to the operation, to the request origin's identity, and to a security policy, has a technical benefit of supplying the embodiment with a DNS security granularity that is consistent with the granularity employed by other security controls, e.g., by conditional access controls. This in turn improves security by promoting consistent treatment of a given identity across a wider variety of operations in a network.

As another example, some embodiments receive a notification of a change in a risk score associated with a device or a risk score associated with a user identity, or both, and in response to receiving the notification, perform at least one of: setting a time-to-live in a domain name record, deleting a domain name record, or flushing at least a portion of a domain name record cache. Basing DNS operations on risk scores in this manner has a technical benefit of providing more complete and consistent network security by coordinating DNS security-related settings with other security settings, namely risk scores. This also implicitly or explicitly identifies which DNS settings relate to security, thereby aiding risk assessment. In particular, in contrast to a scenario outcome noted above, some embodiments would refuse to fulfill a domain name resolution request for access to a highly confidential internal website from a given user after the user's account was flagged by a risk score increase due to unauthorized exfiltration activity.

As another example, in some embodiments a domain name system operation requests a particular result, e.g., a copy of a DNS record, a change to a DNS record, or a domain name resolution. In this example, enforcing the security policy includes: discerning that a non-empty proper subset of a set of conditions specified by the security policy is satisfied, wherein the security policy specifies that all of the conditions be satisfied in order to permit the particular result; and in response to the discerning, barring a portion but not all of the particular result, or barring a portion but not all progress toward the particular result, or barring a portion but not all progress toward a less risky result which is designated as less risky than the particular result.

This DNS security functionality has the technical benefit of improving security by providing flexibility that is missing from approaches that merely grant or deny a requested operation instead of offering a partial grant or a substitute grant. For example, instead of merely denying access to a highly confidential internal network site by withholding its IP address, some embodiments grant access to a less confidential site by resolving the request to an IP address of the less confidential site when some but not all of the access conditions for the highly confidential site are met, e.g., when the user is authenticated and the device is registered, but user's risk score is too high. Internal networks are sometimes referred to as private networks.

As another example, in some embodiments a domain name system operations security assistant is configured to, upon execution by a processor set: add an access requirement that prohibits forwarding an intercepted domain name system operation to a public domain name system server, or add an access requirement that prohibits redirecting the intercepted domain name system operation to a public domain name system server. This DNS security functionality has the technical benefit of improving security by preventing a transmission from an internal DNS server to a public server when the transmission would contain confidential information such as an internal SaaS website address or a preferred email server address.

As another example, in some embodiments a domain name system operation includes or is part of a domain name resolution request for a domain name, and a domain name system operations security assistant is configured to, upon execution by a processor set: read an authentication token which is associated with the user identity, the authentication token issued by an identity provider; locate a domain name record associated with the domain name; and confirm that a time-to-live (TTL) specified in the domain name record does not exceed a lifetime of the authentication token. This DNS security functionality has the technical benefit of improving security by coordinating DNS settings and non-DNS settings such that a user account's DNS operations permission does not outlive the account's authentication lifetime. In particular, in contrast to a scenario outcome noted above, some embodiments would refuse to fulfill a domain name resolution request from a user account after the authentication lifetime of the user account has expired.

As another example, in some embodiments a domain name system operations security assistant is configured to, upon execution by a processor set: detect a security heartbeat anomaly; and in response to detecting the security heartbeat anomaly, flush at least a portion of a domain name record cache. This DNS security functionality has the technical benefit of improving security by restricting or removing access to the IP addresses of internal websites when a security heartbeat is tampered with or disabled, e.g., when an attack or a component failure interferes with Zero Trust monitoring of network access attempts. In some cases, a stolen device is disconnected from a network in an attempt to prevent remote wiping of confidential data stored on the device, or to prevent the device from transmitting its geographic location to aid retrieval. In response, some embodiments flush the internal addresses and other confidential data located in DNS records cached on the device. In some embodiments, the flush includes a secure deletion which overwrites the flushed memory in addition to marking it freed.

These and other benefits will be apparent to one of skill from the teachings provided herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud 136. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 sometimes interact with a computer system 102 user interface 320 by using displays 126, keyboards 106, and other peripherals 106, via typed text, touch, voice, movement, computer vision, gestures, and/or other forms of I/O. Virtual reality or augmented reality or both functionalities are provided by a system 102 in some embodiments. A screen 126 is a removable peripheral 106 in some embodiments and is an integral part of the system 102 in some embodiments. The user interface supports interaction between an embodiment and one or more human users. In some embodiments, the user interface includes one or more of: a command line interface, a graphical user interface (GUI), natural user interface (NUI), voice command interface, or other user interface (UI) presentations, presented as distinct options or integrated.

System administrators, network administrators, cloud administrators, security analysts and other security personnel, operations personnel, developers, testers, engineers, auditors, and end-users are each a particular type of human user 104. In some embodiments, automated agents, scripts, playback software, devices, and the like running or otherwise serving on behalf of one or more humans also have user accounts, e.g., service accounts. Sometimes a user account is created or otherwise provisioned as a human user account but in practice is used primarily or solely by one or more services; such an account is a de facto service account. Although a distinction could be made, "service account" and "machine-driven account" are used interchangeably herein with no limitation to any particular vendor.

Storage devices or networking devices or both are considered peripheral equipment in some embodiments and part of a system 102 in other embodiments, depending on their detachability from the processor 110. In some embodiments, other computer systems not shown in FIG. 1 interact in technological ways with the computer system 102 or with another system embodiment using one or more connections to a cloud 136 and/or other network 108 via network interface equipment, for example.

Each computer system 102 includes at least one processor 110. The computer system 102, like other suitable systems, also includes one or more computer-readable storage media 112, also referred to as computer-readable storage devices 112. In some embodiments, tools 122 include security tools or software applications, on mobile devices 102 or workstations 102 or servers 102, editors, compilers, debuggers and other software development tools, as well as APIs, browsers, or webpages and the corresponding software for protocols such as HTTPS, for example. Files, APIs, endpoints, and other resources may be accessed by an account or set of accounts, user 104 or group of users 104, IP address or group of IP addresses, or other entity. Access attempts may present passwords, digital certificates, tokens or other types of authentication credentials.

Storage media 112 occurs in different physical types. Some examples of storage media 112 are volatile memory, nonvolatile memory, fixed in place media, removable media, magnetic media, optical media, solid-state media, and other types of physical durable storage media (as opposed to merely a propagated signal or mere energy). In particular, in some embodiments a configured storage medium 114 such as a portable (i.e., external) hard drive, CD, DVD, memory stick, or other removable nonvolatile memory medium becomes functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory nor a computer-readable storage device is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as events manifested in the system 102 hardware, product characteristics, inventories, physical measurements, settings, images, readings, volumes, and so forth. Such data is also transformed by backup, restore, commits, aborts, reformatting, and/or other technical operations.

Although an embodiment is described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, some embodiments include one of more of: chiplets, hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. In some embodiments, components are grouped into interacting functional modules based on their inputs, outputs, or their technical effects, for example.

In addition to processors 110 (e.g., CPUs, ALUs, FPUs, TPUs, GPUS, and/or quantum processors), memory/storage media 112, peripherals 106, and displays 126, some operating environments also include other hardware 128, such as batteries, buses, power supplies, wired and wireless network interface cards, for instance. The nouns "screen" and "display" are used interchangeably herein. In some embodiments, a display 126 includes one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory 112.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which are present in some computer systems. In some, virtualizations of networking interface equipment and other network components such as switches or routers or firewalls are also present, e.g., in a software-defined network or a sandboxed or other secure cloud computing environment. In some embodiments, one or more computers are partially or fully "air gapped" by reason of being disconnected or only intermittently connected to another networked device or remote cloud. In particular, DNS operation security functionality 204 could be installed on an air gapped network and then be updated periodically or on occasion using removable media 114, or not updated at all. Some embodiments also communicate technical data or technical instructions or both through direct memory access, removable or non-removable volatile or nonvolatile storage media, or other information storage-retrieval and/or transmission approaches.

One of skill will appreciate that the foregoing aspects and other aspects presented herein under "Operating Environments" form part of some embodiments. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but interoperate with items in an operating environment or some embodiments as discussed herein. It does not follow that any items which are not in outline or parenthetical form are necessarily required, in any Figure or any embodiment. In particular, FIG. 1 is provided for convenience; inclusion of an item in FIG. 1 does not imply that the item, or the described use of the item, was known prior to the current disclosure.

In any later application that claims priority to the current application, reference numerals may be added to designate items disclosed in the current application. Such items may include, e.g., software, hardware, steps, processes, systems, functionalities, mechanisms, data structures, computational resources, programming languages, tools, workflows, or algorithm implementations, or other items in a computing environment, which are disclosed herein but not associated with a particular reference numeral herein. Corresponding drawings may also be added.

More About Systems

FIG. 2 illustrates a computing system 102 configured by one or more of the DNS operation security functionality enhancements taught herein, resulting in an enhanced system 202. In some embodiments, this enhanced system 202 includes a single machine, a local network of machines, machines in a particular building, machines used by a particular entity, machines in a particular datacenter, machines in a particular cloud, or another computing environment 100 that is suitably enhanced. FIG. 2 items are discussed at various points herein, and additional details regarding them are provided in the discussion of a List of Reference Numerals later in this disclosure document.

FIG. 3 shows some aspects of some enhanced DNS operation security systems 202. This is not a comprehensive summary of all aspects of enhanced systems 202 or all aspects of DNS operation security functionality 204. Nor is it a comprehensive summary of all aspects of an environment 100 or system 202 or other context of an enhanced system 202, or a comprehensive summary of any aspect of functionality 204 for potential use in or with a system 102. FIG. 3 items are discussed at various points herein, and additional details regarding them are provided in the discussion of a List of Reference Numerals later in this disclosure document.

FIG. 4 shows some aspects of secured DNS operations 220. This is not a comprehensive summary of all aspects of DNS operation security. FIG. 4 items are discussed at various points herein, and additional details regarding them are provided in the discussion of a List of Reference Numerals later in this disclosure document.

FIG. 5 shows some aspects of data flow in an example DNS operation security architecture 500. This is not a comprehensive summary of all aspects of DNS operation security architectures or of all data flow in any particular architecture. FIG. 5 items are discussed at various points herein, and additional details regarding them are provided in the discussion of a List of Reference Numerals later in this disclosure document.

The other figures are also relevant to systems 202. FIGS. 6 and 7 illustrate methods of functionality 204 in operation in some systems 202.

In some embodiments, the enhanced system 202 is networked through an interface 320. In some, an interface 320 includes hardware such as network interface cards, software such as network stacks, APIs, or sockets, combination items such as network connections, or a combination thereof.

Some embodiments include a computing system 202 which is configured to assist in securing domain name system operations. The computing system includes: a digital memory 112, and a processor set 110 including at least one processor, the processor set in operable communication with the digital memory. The system 202 also includes a domain name system operations security assistant 302, which is configured to, upon execution by the processor set, determine 602 a device identity 130 associated with a domain name system operation 220, or ascertain 604 a user identity 124 associated with the domain name system operation 220, or both, and enforce 606 a security policy 208 against the domain name system operation. The enforcement 606 is based on at least the domain name system operation and the device identity, or based on the domain name system operation and the user identity, or based on both.

In particular, some embodiments correlate a DNS lookup 214 to a specific user or a specific application based on the user identity, and some embodiments correlate a DNS lookup to a specific device based on the device identity. In some embodiments, enforcement filtering 606 based on one or both identities 124, 130 separates DNS results 422 that required a particular security characteristic (e.g., MFA) or a particular security level (e.g., top secret) from other results 422. In some embodiments and scenarios, for example, the DNS result(s) 422 that required MFA per a policy 208 are excluded from general DNS lookups on the same machine, and in particular are separated from results which are in the same user session (logon session) but are from a different application that is attempting to resolve the same hostname.

In some embodiments, enforcement 606 includes performing at least one of: preventing 702 a result 422 requested by the domain name system operation, permitting 704 computational progress toward the result 422 requested by the domain name system operation, allowing 708 a different result 422 than the result 422 requested by the domain name system operation, modifying 712 a domain name system record 212, or flushing 514 at least a portion of a cache 218 containing at least one domain name record 212.

In some embodiments and scenarios, preventing 702 a result 422 requested by the domain name system operation includes an assistant 302 or another functionality 204 component returning an error code or a null value as the actual result when the requested result is a domain name resolution, a copy of a DNS record, or a change to a DNS record (the DNS record is prevented from being changed in the way requested, if it is changed at all).

In some embodiments and scenarios, permitting 704 computational progress toward the result 422 requested includes an assistant 302 or another functionality 204 component sending the domain name system operation to a DNS server 430 or a DNS resolver 504, which then provides at least some of the permitted computational progress. In some cases, an endorsement 448 such as a certificate or a hash or an authentication token is sent with the domain name system operation, so the recipient server or resolver is able to confirm that the request 310 has been vetted against applicable policy 208.

In some embodiments and scenarios, allowing 708 a different result than the result 422 requested by the domain name system operation includes an assistant 302 or another functionality 204 component seeking or accepting a result that is not an outright denial of the request but is also not the actual result requested.

In one example, an operation requesting 310 resolution of a domain filings-editor.contoso.com does not fail entirely. It produces a substitute result (an IP address for filings-overview.contoso.com), instead of producing the requested result (the IP address for filings-editor.contoso.com). While the tool 122 at filings-editor.contoso.com permits viewing and editing any part of a set of regulatory filings, a less powerful tool 122 at filings-overview.contoso.com provides a read-only overview of the regulatory filings. When the embodiment determines that the resolution request 310 came from a user identity or a device that lacks sufficient permission to access filings-editor.contoso.com, the embodiment resolves the request instead to the less risky tool at filings-overview.contoso.com.

Some examples of different results which are allowed 708 as substitutes or partial results include: a partial DNS record when the full DNS record was requested, a read-only permission to access a DNS record when write permission was requested, a shorter DNS record time-to-live value 410 than a requested TTL value, or an IP address of a site having less sensitive content when the IP address of a site with more sensitive content was requested.

In some embodiments and scenarios, modifying 712 a domain name system record 212 includes modifying an IP address 216, modifying a time-to-live 410, or modifying a domain name 132 in the domain name system record. Deletion is considered a modification.

In some embodiments and scenarios, flushing 514 at least a portion of a cache 218 containing at least one domain name record 212 merely marks the flushed records as invalid or as deleted, or both. However, in some cases flushing 514 also includes overwriting the memory 112 that held the flushed data 212, to inhibit unauthorized recovery or misuse of that data.

In some embodiments, the domain name system operations security assistant 302 is configured to, upon execution by the processor set: check 722 whether the device associated with the DNS operation is enrolled as a managed device 424; and to prevent 702 the result requested by the domain name system operation when the device is not enrolled as a managed device.

For example, some embodiments resolve an internal network domain name as requested after a check 722 determines that the device 101 originating the resolution request 310 is a managed device 424 and is otherwise authorized. However, these embodiments either deny the request 310, or else allow 708 resolution only to a non-sensitive IP address, after a check 722 determines that the device originating the resolution request 310 is not recognized as one of the managed devices. Thus, even when a rogue device has access to part of an internal network, access by the device to more sensitive data via DNS operations will still be denied.

In some embodiments, the domain name system operation includes or is part of a domain name resolution 214 request 310 for a domain name 132, and the domain name system operations security assistant 302 is configured to, upon execution by the processor set: read 724 an authentication token 312 which is associated with the user identity 124, the authentication token issued by an identity provider 404; locate 710 a domain name record 212 associated with the domain name; and confirm 742 that a time-to-live specified in the domain name record does not exceed a lifetime of the authentication token. Some embodiments set the TTL to the max-of (TTL, authentication token lifetime). However, an approach which reduces risk more is to calculate how much of the authentication lifetime is actually left at the current time, and then make sure the TTL listed does not exceed that amount.

In some embodiments, confirming 742 shortens the time-to-live 410 as necessary to ensure that the DNS record will not be valid (i.e., will be expired, will have no remaining time-to-live) after the identity's authentication lifetime is over. These embodiments help prevent situations in which cached DNS data is vulnerable to being used by an identity after the identity's authentication has expired.

In some embodiments, the domain name system operations security assistant 302 is configured to, upon execution by the processor set: get 734 a security group identification 436 which identifies a security group 432, the user identity being a member of the security group; and base the enforcing 606 on at least the security group identification.

For example, in some cases a policy 208 specifies membership in a particular security group 432 as a condition for writing any DNS record 212, or as a condition for reading or writing a DNS MX record 212. DNS MX records direct email to a mail server. Therefore, in some embodiments a policy 208 restricts access to MX records to only the user identities 124 that belong to a mail administration security group or a network administration security group.

In some embodiments, the domain name system operations security assistant 302 is configured to, upon execution by the processor set: get 736 a security role identification 436 which identifies a security role 434, the user identity being a holder of the security role; and base the enforcing

606 on at least the security role identification. Holding a role is also referred to as filling the role.

For example, in some cases a policy 208 specifies holding a particular security role 434 as a condition for writing a DNS NS record 212. A DNS NS record provides a list of authoritative name servers responsible for the domain. Malicious tampering with the list, or even the accidental introduction of an error in the list, could cause problems by placing data at risk of loss or risk of unwanted exposure, or by interfering with network access by authorized users, for example. Therefore, in some embodiments a policy 208 restricts access to NS records to only the user identities 124 that fill a privileged administrator role 434.

In some embodiments, the domain name system operations security assistant 302 is configured to, upon execution by the processor set: detect 738 a security heartbeat anomaly 446; and in response to detecting the security heartbeat anomaly, flush 514 at least a portion of a domain name record cache 218. As one example, when a heartbeat 444 is interrupted because a normally online device is taken offline and stolen, the DNS records cached on the device are securely deleted to prevent their misuse.

In some embodiments, the domain name system operations security assistant 302 is configured to, upon execution by the processor set: add 732 an access requirement 414 that prohibits forwarding 418 an intercepted domain name system operation 220 to a public 426 domain name system server 430; or add 732 an access requirement 414 that prohibits redirecting 420 the intercepted domain name system operation 220 to a public 426 domain name system server 430. For example, some embodiments prevent a request 310 for resolution 214 of a sensitive internal network site's domain name from being sent (418 or 420) outside the internal network, where it would be more vulnerable to disclosure.

Other system embodiments are also described herein, either directly or derivable as system versions of described processes or configured media, duly informed by the extensive discussion herein of computing hardware.

Although specific DNS operation security architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different kinds of DNS operation security functionality, for example, as well as different technical features, aspects, mechanisms, software, expressions, operational sequences, commands, data structures, programming environments, execution environments, environment or system characteristics, or other functionality consistent with teachings provided herein, and may otherwise depart from the particular examples provided.

Processes (a.k.a. Methods)

Processes (which are also be referred to as "methods" in the legal sense of that word) are illustrated in various ways herein, both in text and in drawing figures. FIGS. 5, 6, and 7 each illustrate a family of methods 500, 600, and 700 respectively, which are performed or assisted by some enhanced systems, such as some systems 202 or another DNS operation security functionality enhanced system as taught herein. Method families 500 and 600 are each a proper non-empty subset of method family 700.

Some variations on FIG. 6 include intercepting 744 a DNS operation, and some variations exclude one of the identity-obtaining steps 602 or 604. These are merely examples of variations; as noted elsewhere, any operable combination of steps that are disclosed herein may be part of a given embodiment.

FIGS. 1 to 5 illustrate DNS operation securing system 202 architectures with implicit or explicit actions, e.g., receiving a domain name 132 in a user interface, navigating to an IP address 216 in a web browser or other tool 122, authenticating to an identity provider 404, enrolling a device 101 as a managed device 424, establishing or modifying one or more of a security policy 208 or a security group 432 or a security role 434 via an administrative interface, or otherwise processing data 118, in which the data 118 includes, e.g., digital representations of identities 124, 130, domain names 132, DNS operations 220, 134, IP addresses 216, risk scores 308, DNS records 212, operation results 422, and system or device health data 316, among other examples disclosed herein.

Technical processes shown in the Figures or otherwise disclosed will be performed automatically, e.g., by an enhanced system 202, unless otherwise indicated. Related non-claimed processes may also be performed in part automatically and in part manually to the extent action by a human person is implicated, e.g., in some situations a human 104 types or speaks in natural language a domain name 132, which is captured in the system 202 as digital data 118 (items represented in this disclosure's figures are presumed to be digital data, computing hardware, computational activity, or a combination thereof). Natural language means a language that developed naturally, such as English, French, German, Hebrew, Hindi, Japanese, Korean, Spanish, etc., as opposed to designed or constructed languages such as programming languages. Regardless, no process contemplated as an embodiment herein is entirely manual or purely mental; none of the claimed processes can be performed solely in a human mind or on paper. Any claim interpretation to the contrary is squarely at odds with the present disclosure.

In a given embodiment zero or more illustrated steps of a process may be repeated, perhaps with different parameters or data to operate on. Steps in an embodiment may also be done in a different order than the top-to-bottom order that is laid out in FIG. 7. FIG. 7 is a supplement to the textual examples of embodiments provided herein and the textual descriptions of embodiments provided herein. In the event of any alleged inconsistency, lack of clarity, or excessive breadth due to an aspect or interpretation of FIG. 7, the text of this disclosure shall prevail over that aspect or interpretation of FIG. 7.

Arrows in process or data flow figures indicate allowable flows; arrows pointing in more than one direction thus indicate that flow may proceed in more than one direction. Steps may be performed serially, in a partially overlapping manner, or fully in parallel within a given flow. In particular, the order in which flowchart 700 action items are traversed to indicate the steps performed during a process may vary from one performance instance of the process to another performance instance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim of an application or patent that includes or claims priority to the present disclosure. To the extent that a person of skill considers a given sequence S of steps which is consistent with FIG. 7 to be non-operable, the sequence S is not within the scope of any claim. Any assertion otherwise is contrary to the present disclosure.

Some embodiments provide or utilize method 700 of securing domain name system operations; the method is performed by a computing system 202. In this discussion and generally elsewhere herein, "method" is used in the legal sense and "process" is used in the computer science sense. The method includes at least automatically: determining 602 a device identity associated with a domain name system operation or ascertaining 604 a user identity associated with the domain name system operation, and then enforcing 606 a security policy against the domain name system operation. The determining 602 and the ascertaining 604 may be performed in either order relative to one another, or in an overlapping manner which includes partially or fully concurrent performances. The enforcing 606 is based on at least the domain name system operation and the device identity, or at least the domain name system operation and the user identity, or both. The enforcing 606 includes at least one of: preventing 702 a result requested by the domain name system operation, permitting 704 computational progress toward the result requested by the domain name system operation, allowing 708 a different result than the result requested by the domain name system operation, modifying 712 a domain name system record, or flushing 514 at least a portion of a cache containing at least one domain name record.

In some embodiments, the domain name system operation 220 includes or is part of a domain name resolution 214 request 310 for a domain name 132, and enforcing 606 the security policy includes: assessing 716 a domain name resolution risk 306 based on at least the security policy 208 and based on at least one of: the user identity 124, or the device identity 130; selecting 718 an IP address from a set of IP addresses which are identified in a set of domain name system records 212 as potential resolutions 402 of the domain name, the selecting based on at least a result of the assessing; and providing 720 the selected IP address in response to the domain name resolution request.

In some embodiments, enforcing 606 the security policy includes: checking 722 whether the device is compliant with a specified device security policy 208; and preventing 702 the result requested by the domain name system operation when the device is not compliant with the specified device security policy. For example, in some scenarios a device which does not have an approved authenticator app installed as specified by a policy 208 is prevented 702 from resolving domain names to an internal network IP address. In some scenarios device must be compliance with a specified policy overlaps being a managed device. However, policy compliance also covers additional devices in some cases, e.g., even a non-managed device could satisfy some security requirements. For instance, the policy could require that the device utilize MFA, which is possible even for a non-managed device.

In some embodiments, enforcing 606 the security policy includes: reading 724 an authentication token 312 which is associated with the user identity, the authentication token issued by an identity provider; and basing the enforcing on at least the authentication token. For example, in some scenarios the user identity 124 on which enforcement 606 is based is specified in the authentication token (in other scenarios user identity is specified elsewhere). In some scenarios a maximum allowed TTL 410 of a DNS record is capped by an authentication lifetime 438 that is specified in the authentication token (in other scenarios authentication lifetime is specified elsewhere). In some embodiments, a sign-in frequency determines or influences a token lifetime 438. In some, the authentication lifetime 438 is valid for up to one hour in some cases and for as little as five minutes.

Some embodiments include receiving 726 a notification 408 of a change in a health status 316 of the device; and in response to receiving the notification, performing at least one of: setting 712 a time-to-live in a domain name record, deleting 714 a domain name record, or flushing 514 at least a portion of a domain name record cache. For example, in some scenarios a notification indicates that the health status of a device has changed from "normal" to "possibly compromised or under attack", and in response the embodiment securely flushes 514 all cached DNS records from the device.

Some embodiments include receiving 726 a notification 408 of a change in a risk score 308 associated with the device or a risk score 308 associated with the user identity, or both; and in response to receiving the notification, performing at least one of: setting 712 a time-to-live in a domain name record, deleting 714 a domain name record, or flushing 514 at least a portion of a domain name record cache. For example, in some scenarios a notification indicates that the risk score of a user identity has changed to "very low risk" or to "highly trusted", and in response the embodiment sets 712 a DNS TTL 410 to the maximum time remaining in the user identity's authentication lifetime 438. in some scenarios, a risk level is currently low but a history shows the risk level goes high frequently (i.e., more than a specified frequency threshold), so the embodiment sets 712 a DNS TTL 410 to a minimum value.

In some embodiments, the domain name system operation requests a particular result 422, and enforcing 606 the security policy includes: discerning 728 that a non-empty proper subset 406 of a set of conditions 318 specified by the security policy 208 is satisfied 730, wherein the security policy specifies that all of the conditions be satisfied in order to permit the particular result; and in response to the discerning, barring 706 a portion but not all of the particular result, or barring 706 a portion but not all progress toward the particular result, or barring 706 a portion but not all progress toward a less risky result 512 which is designated as less risky than the particular result.

For example, in one scenario a policy 208 specifies that domain name resolutions to internal network IP addresses are conditioned on the user identity belonging to a fulltime-employee security group 432, and the policy also specifies a condition that the device from which the resolution request originates be registered as a managed device 424. An intern who is not a fulltime employee uses a managed device to request access to an internal network SaaS website. In response, the embodiment queries an administrator whether to approve the intern's request. The embodiment also suspends the requested resolution operation 134, thus barring 706 a portion but not all computational progress toward the requested resolution 214, 422.

In some embodiments, enforcing 606 the security policy includes assessing 716 a risk 306 based on at least the security policy and based on at least one of the user identity or the device identity, and enforcing 606 the security policy further includes performing at least one of the following in response to a result of the assessing: adding 732 an access requirement 414 specifying that a network protocol 416 with a specified security characteristic 440 or a specified security level 442, or both, be utilized for a network communication which includes the intercepted domain name system operation 220; adding 732 an access requirement 414 specifying that a network protocol 416 with a specified security characteristic 440 or a specified security level 442, or both, be utilized for a network communication which responds to the intercepted domain name system operation 220; adding 732 an access requirement 414 that prohibits use of a network protocol 416 with a specified security characteristic 440 or a specified security level 442, or both; adding 732 an access requirement 414 that prohibits forwarding 418 the intercepted domain name system operation to a public 426 domain name system server 430; or adding 732 an access requirement 414 that prohibits redirecting 420 the intercepted domain name system operation to a public 426 domain name system server 430.

For example, in one scenario an embodiment adds 732 an access requirement 414 specifying that a network protocol 416 with encryption 440 be utilized for any DNS operation network communication.

Some embodiments remove 748 a requirement in response to a change in health status or another notification of an assessed risk of a DNS operation. In some cases, the removed requirement is one previously added 732. Some examples include requiring TLS or HTTPS for DNS communications, and preventing the forwarding of a resolution request to a public DNS server. In some scenarios, the policy 208 specifies a minimum set of requirements 414 which are not removable regardless of dynamic changes.

Configured Storage Media

Some embodiments include a configured computer-readable storage medium 112. Some examples of storage medium 112 include disks (magnetic, optical, or otherwise), RAM, EEPROMS or other ROMs, and other configurable memory, including in particular computer-readable storage media (which are not mere propagated signals). In some embodiments, the storage medium which is configured is in particular a removable storage medium 114 such as a CD, DVD, or flash memory. A general-purpose memory, which is be removable or not, and is volatile or not, depending on the embodiment, can be configured in the embodiment using items such as a DNS operation security assistant 302, identities 124, 130, DNS operations 220, IP addresses 216, risk scores 308, authentication tokens 312, health data 316, policies 208 specifying conditions 318, DNS records 212, and DNS record caches 218, in the form of data 118 and instructions 116, read from a removable storage medium 114 and/or another source such as a network connection, to form a configured storage medium. The configured storage medium 112 is capable of causing a computer system 202 to perform technical process steps for providing or utilizing DNS operation security functionality 204 as disclosed herein. The Figures thus help illustrate configured storage media embodiments and process (a.k.a. method) embodiments, as well as system and process embodiments. In particular, any of the method steps illustrated in FIG. 5, 6, or 7, or otherwise taught herein, may be used to help configure a storage medium to form a configured storage medium embodiment.

Some embodiments use or provide a computer-readable storage device 112, 114 configured with data 118 and instructions 116 which upon execution by a processor 110 cause a computing system 202 to perform a method 700 of securing domain name system operations. This method 700 includes: intercepting 744 a domain name system operation; determining 602 a device identity associated with the domain name system operation or ascertaining 604 a user identity associated with the domain name system operation, or both; and enforcing 606 a security policy against the domain name system operation. The enforcing 606 is based on at least the domain name system operation and the device identity, or at least the domain name system operation and the user identity, or both. The enforcing 606 includes at least one of: preventing 702 a result requested by the domain name system operation, permitting 704 computational progress toward the result requested by the domain name system operation, allowing 708 a different result than the result requested by the domain name system operation, modifying 712 a domain name system record, or flushing 514 at least a portion of a cache containing at least one domain name record.

In some embodiments, the intercepting 744 occurs on the device, and enforcing 606 the security policy also occurs at least partially on the device. In some scenarios, this is more efficient than an approach in which an operation 220 leaves the device, is analyzed elsewhere, and a command to perform the device-local portion of the operation is sent back to the device through intermediate devices.

In some embodiments, the domain name system operation 220 includes or is part of a domain name resolution request for a domain name 132, and enforcing 606 the security policy includes: assessing 716 a domain name resolution risk 306 based on at least the security policy and based on at least one of: the user identity, or the device identity; choosing 740 a response tier 412 from a set of response tiers, the choosing based on at least a result of the assessing; selecting 718 an IP address from a set of one or more IP addresses which correspond to the response tier, the selected IP address corresponding to exactly one of the response tiers, the selected IP address identified in a set of domain name system records 212 as a potential resolution 402 of the domain name; and providing 720 the selected IP address in response to the domain name resolution request.

In some embodiments, the set of response tiers 412 includes at least three tiers, each tier having a respective selectable IP address 216 which is distinct from all selectable IP addresses of the other tiers.

For example, in one scenario an embodiment chooses between a low-risk user tier 412, a medium-risk user tier 412, and a high-risk user tier 412 based on a risk assessment 308. The low-risk user tier 412 corresponds to an IP address 10.8.1.21, the medium-risk user tier 412 corresponds to an IP address 10.8.1.22, and the high-risk user tier 412 corresponds to an IP address 10.8.1.23. Each of these IP addresses appears in a DNS A record 212 for the domain name expenses.contoso.com and is therefore a potential resolution 402 of that domain name. A low-risk user (high trust user) version of expenses accounting software provided at 10.8.1.21 allows a logged in user to read, write, modify, or summarize expense reports for any group of user identities in an enterprise, and to add new user identities. A medium-risk (medium trust) version of expenses accounting software provided at 10.8.1.22 allows a logged in user to read, write, modify, or summarize their own expense reports and to summarize expense reports department-wide or enterprise-wide. A high-risk (low trust) version of expenses accounting software provided at 10.8.1.23 only allows a logged in user to read, write, modify, or summarize their own expense reports.

In some embodiments, the domain name system operation 220 includes or is part of a domain name resolution request for a domain name, and enforcing 606 the security policy includes: assessing 716 a domain name resolution risk based on at least the security policy and based on at least one of:

the user identity, or the device identity; selecting 718 an IP address set from a collection of IP address sets, each IP address set of the collection including one or more IP addresses which are identified in one or more domain name system records as potential resolutions of the domain name, the selecting based on at least a result of the assessing; and providing 720 an IP address of the selected IP address set in response to the domain name resolution request. In contrast with response tiered 412 embodiments discussed above, the IP address sets in these embodiments are not necessarily non-overlapping sets. Which IP address set is used when the same IP address belongs to two sets depends in some cases on additional security factors, such as device policy compliance, overall threat levels, or type of encryption to be employed.

Additional Observations

Additional support for the discussion of DNS operation security functionality 204 herein is provided under various headings. However, it is all intended to be understood as an integrated and integral part of the present disclosure's discussion of the contemplated embodiments.

One of skill will recognize that not every part of this disclosure, or any particular details therein, are necessarily required to satisfy legal criteria such as enablement, written description, best mode, novelty, nonobviousness, inventive step, or industrial applicability. Any apparent conflict with any other patent disclosure, even from the owner of the present subject matter, has no role in interpreting the claims presented in this patent disclosure. With this understanding, which pertains to all parts of the present disclosure, examples and observations are offered herein.

Some embodiments provide or utilize secure MFA-based conditional Zero-Trust DNS. MFA stands for multi-factor authentication.

Some enterprises use DNS for accessing applications using FQDN (fully qualified domain names) or hostnames. Some use DNS resolution 214 to convert the hostname 132 or FQDN 132 to an IP address and then communicate with software or devices at this IP address via network 108 traffic. However, in some situations DNS resolution is an attack vector used by malicious entities to override traffic, or steer traffic to malicious unintended destinations, and so on, leading at times to compromised security and successful phishing attacks.

Some enhancements to DNS are designed to bring more security to DNS by enabling encryption for DNS protocol communications, e.g., by using DNSSec, HTTPS, SSL (secure sockets layer), or TLS (transport layer security). However, these enhancements are based on characteristics at the network level. Some embodiments described herein provide finer granularity. Some embodiments herein are nonetheless compatible with network level security controls, such as HTTPS, SSL, or TLS protocol usage.

Some embodiments provide a secure user-identity-based DNS resolution capability which is consistent with conditional access capabilities of security controls and consistent with identity platforms. Some embodiments provide DNS securing capabilities which make DNS more secure than other industry approaches.

In some embodiments, in order for any DNS request to be resolved, the DNS request is intercepted 744, and the embodiment ensures that user-identity-specific conditional access authentication and security policies 208 are applied and enforced. In some scenarios, the enforcement 606 for a particular user identity or a particular set of user identities is based on device compliance, MFA, physical passkey-based authentication, or digital certificate-based authentication, or a combination of these and possibly other security attributes. Then the embodiments securely resolve 214 the DNS request using a cloud service. Some secure DNS operation architectures leverage user identity as well as network level security and encryption, applying them to all DNS queries using a security service edge solution.

In one scenario, a private application has a user interface at abc.contoso.com, which is defined in DNS records as mapping to any of the IP addresses 10.8.1.1 through 10.8.1.5. A given endpoint managed device does not know which of these IP addresses will be most suitable, or even which will be permitted, in a given attempt to access the software at abc.contoso.com. Indeed, in some cases a different IP address will be provided instead, e.g., as part of an incident management process. The endpoint managed device relies on DNS resolution to provide the IP address, and the endpoint managed device then navigates to the provided IP address.

In some embodiments, secure DNS resolution functionality 204 does not by default treat the endpoint managed device DNS resolution request like any other endpoint-server traffic, but instead adds security, e.g., by enforcing 606 one or more conditional access policies 208 on the DNS resolution operations. In one example, the enforcement includes evaluation of risk attributes, such as whether the request originates from a user account marked as high risk, and whether the request originates from a usual location for the user account, as part of a determination whether to allow access to a particular resource such as one of the interfaces 320 for abc.contoso.com software.

Some embodiments put DNS behind a conditional access engine 302. As a result, these embodiments ensure that an endpoint device (e.g., user laptop) or a target device (e.g., abc.contoso.com server) or both are compliant with applicable policies 208 before allowing the device to get a DNS request 310 response. For instance, one policy enforced in some cases is a policy requiring MFA, another is a policy restricting access based on device location, e.g., global positioning system coordinates, and another policy is one requiring specified health metrics (e.g., being below a max memory usage, below a max CPU usage, above a min signal strength, below a max latency, with no malware detected, etc.).

In some embodiments, a client 202 has an agent 302 with a driver 302 which intercepts 744 DNS traffic, checks for identity 130 and authentication, and if the identity and authentication are ok, sends the intercepted DNS traffic to a DNS resolver 504. In some cases, the agent 302 connects to a server 430, creates a tunnel, authenticates the user, and verifies the device identity. In some, a device identifier software 302 of a managed device goes to an identity provider 404, gets a device token, checks the token for the device ID, and then the device ID is checked by policy enforcement 302 to provide conditional access at the device level.

Some embodiments provide a channel between a DNS server 430 and an agent 302. In some cases, the embodiment revokes a granted request 310 by modifying 712 cached DNS records. More generally, in some cases the embodiment uses the channel to update or refresh or delete DNS records 212 or other info in a client's DNS cache. In particular, in some cases the embodiment sets a new DNS TTL based on attributes and a policy.

In some cases, an embodiment dynamically updates a previously-approved hostname lookup, e.g., changes a TTL or a mapped IP address. In some cases, an embodiment dynamically revokes a previously-approved hostname lookup. For example, in one scenario a first DNS request was permitted based on MFA usage and the embodiment successfully mapped a domain name to an IP address address-1. Then the embodiment detected a change in health status 316. A policy comparison is triggered by the detection (e.g., notification receipt) of the health change. Upon comparing the current health status to the policy 208, the embodiment finds the status non-compliant with the policy. Accordingly, the embodiment dynamically revokes the prior mapping to IP address address-1. In some cases, dynamic update only prevents a later DNS lookup. In other cases, dynamic update also prevents subsequent communication via IP address address-1, e.g., traffic to address-1 is blocked using driver-level interception, exfiltration prevention tools, or another traffic blocking mechanism.

In some instances, a DNS request is not be publicly resolvable. That is to say, unless health conditions and identity meet the policy requirements, and therefore the system redirects the DNS request to a custom DNS server with this non-public mapping, then the request would fail even if it went to a public DNS server, because the hostname->IP mapping is not in the public DNS records even if the IP address is reachable from the public internet.

In some scenarios, some embodiments lock out an identity, e.g., by barring requests 310 from the identity permission to access public DNS servers. This is accomplished by disabling forwarding or redirection of the identity's requests to any public DNS server.

In response to dynamic health changes of a device 101, some embodiments block traffic sent to IP addresses that were in a prior response 422 when the device was healthy. Some embodiments restrict the time-to-live in the responses, e.g., they modify TTL to ensure any cached responses get flushed after no longer than X seconds, where X is based on one or more of: a security policy maximum TTL, a lifespan of a health certificate, or a lifetime of an authentication token.

In some cases, an embodiment alters or flushes cached DNS responses 422, based on a dynamic health change notification. In one example, an embodiment revokes a granted one-hour TTL. Unlike a much less granular certificate revocation, the embodiment focuses IP address resolution revocation to stop all access to an IP address for a particular user, but only for that particular user. This also avoids security vulnerabilities that arise, e.g., when user sessions are terminated but DNS cached resolutions remain viable. Moreover, in some scenarios new requests will also not resolve, as part of enforcement 606.

In some embodiments, securing 206 DNS includes intercepting a DNS operation, correlating it with a device and a user, and enforcing a security policy based on at least the operation, the device, and the user. In some scenarios, possible outcomes of policy enforcement include: prevent the operation, permit the operation, allow a different operation (e.g., return a different IP address based on risk), modify a DNS record (e.g., TTL), or flush a cache.

In some scenarios, DNS security enforcement is not limited to yes/no results but instead selects an IP address from a group of IP addresses based on a risk assessment. In one example, a private network app.contoso.com is resolved to 10.8.1.1 for a low-risk user but is resolved to 10.8.1.4 for a higher-risk user, with the .1 site providing access to confidential info that is not accessible via the .4 site.

In some embodiments, the system 202 is, or includes, an embedded system such as an Internet of Things system. "IoT" or "Internet of Things" means any networked collection of addressable embedded computing or data generation or actuator nodes. An individual node is referred to as an internet of things device 101 or IoT device 101 or internet of things system 102 or IoT system 102. Such nodes are examples of computer systems 102 as defined herein, and may include or be referred to as a "smart" device, "endpoint", "chip", "label", or "tag", for example, and IoT may be referred to as a "cyber-physical system". In the phrase "embedded system" the embedding referred to is the embedding a processor and memory in a device, not the embedding of debug script in source code.

IoT nodes and systems typically have at least two of the following characteristics: (a) no local human-readable display; (b) no local keyboard; (c) a primary source of input is sensors that track sources of non-linguistic data to be uploaded from the IoT device; (d) no local rotational disk storage-RAM chips or ROM chips provide the only local memory; (e) no CD or DVD drive; (f) being embedded in a household appliance or household fixture; (g) being embedded in an implanted or wearable medical device; (h) being embedded in a vehicle; (i) being embedded in a process automation control system; or (j) a design focused on one of the following: environmental monitoring, civic infrastructure monitoring, agriculture, industrial equipment monitoring, energy usage monitoring, human or animal health or fitness monitoring, physical security, physical transportation system monitoring, object tracking, inventory control, supply chain control, fleet management, or manufacturing. IoT communications may use protocols such as TCP/IP, Constrained Application Protocol (CoAP), Message Queuing Telemetry Transport (MQTT), Advanced Message Queuing Protocol (AMQP), HTTP, HTTPS, Transport Layer Security (TLS), UDP, or Simple Object Access Protocol (SOAP), for example, for wired or wireless (cellular or otherwise) communication. IoT storage or actuators or data output or control may be a target of unauthorized access, either via a cloud, via another network, or via direct local access attempts.

Technical Character

The technical character of embodiments described herein will be apparent to one of ordinary skill in the art, and will also be apparent in several ways to a wide range of attentive readers. Some embodiments address technical activities such as intercepting 744 network communications, resolving 214 domain name requests, automatically determining 602 a computing device electronic identity 130, automatically ascertaining 604 an electronic user account identity 124, modifying 712 a digital DNS record data structure 212 in a computer memory 112, and flushing 514 memory 112 that is utilized as a DNS record 212 cache 218, which are each an activity deeply rooted in computing technology. Some of the technical mechanisms discussed include, e.g., the domain name system 210, DNS caches 218, DNS operations security software 302 interfaces 320, policies 208, and DNS resolvers 504. Some of the technical effects discussed include, e.g., computing system 102 security vulnerability mitigation (e.g., reduction or avoidance), coordination of DNS settings with security control settings that are not inherently limited to DNS (e.g., policies 208, authentication lifetimes 438), and finer granularity when securing DNS operations 220 in a zero trust network 108. Thus, purely mental processes and activities limited to pen-and-paper are clearly excluded. Other advantages based on the technical characteristics of the teachings will also be apparent to one of skill from the description provided.

One of skill understands that securing DNS operations in general is a technical activity which cannot be performed mentally, because it requires interception or other use of network 108 traffic, reading and writing variables and other data structures in memory 112, executing DNS server 430 software, and otherwise altering the state of computing system memory 112. As disclosed herein, securing DNS operations also involves automatic execution of software which determines 602 a device's identity without relying on human inspection of the device, ascertains 604 a user account's identity without relying on human inspection of account data structures, and enforces 606 a security policy 208 without querying a human administrator at every instance of enforcement; these DNS securing operations cannot be performed mentally or manually. Moreover, one of skill understands that attempting to perform DNS security operations such as determining 602 or ascertaining 604 identity even in part manually would create unacceptable delays in program execution, pose severe security risks, and introduce a significant risk of human errors that can create security vulnerabilities, cause programs to crash, increase the risk of unauthorized data exfiltration, deletion, or corruption, and otherwise violate an enterprise's policies 208 or government regulations or both. People also manifestly lack the speed, accuracy, memory capacity, and specific processing capabilities required to perform DNS operations security as taught herein.

In particular, DNS 210 is a part of computing technology, and so is system 102 security. Hence, the DNS security improvements such as functionality 204 described herein are improvements to computing technology.

Different embodiments provide different technical benefits or other advantages in different circumstances, but one of skill informed by the teachings herein will acknowledge that particular technical advantages will likely follow from particular embodiment features or feature combinations, as noted at various points herein. Any generic or abstract aspects are integrated into a practical application such as internet access gateways, private network gateways, identity providers, conditional access security controls, or DNS resolvers.

Some embodiments described herein may be viewed by some people in a broader context. For instance, concepts such as efficiency, reliability, user satisfaction, or waste may be deemed relevant to a particular embodiment. However, it does not follow from the availability of a broad context that exclusive rights are being sought herein for abstract ideas; they are not.

Rather, the present disclosure is focused on providing appropriately specific embodiments whose technical effects fully or partially solve particular technical problems, such as how to improve DNS security in a zero trust network scenario, how to reduce or remove or avoid vulnerabilities when a previously authorized user account is terminated, how to reduce or remove or avoid vulnerabilities when a managed device is stolen, and how to provide finer granularity for DNS operations than the network-wide granularity of HTTPS and TLS controls. Other configured storage media, systems, and processes involving efficiency, reliability, user satisfaction, or waste are outside the present scope. Accordingly, vagueness, mere abstractness, lack of technical character, and accompanying proof problems are also avoided under a proper understanding of the present disclosure.

Additional Combinations and Variations

Any of these combinations of software code, data structures, logic, components, communications, and/or their functional equivalents may also be combined with any of the systems and their variations described above. A process may include any steps described herein in any non-empty subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular scenarios, motivating examples, operating environments, tools, peripherals, software process flows, identifiers, repositories, data structures, data selections, naming conventions, notations, control flows, or other implementation choices described herein. Any apparent conflict with any other patent disclosure, even from the owner of the present subject matter, has no role in interpreting the claims presented in this patent disclosure.

Note Regarding Hyperlinks

Portions of this disclosure refer to URLs, hyperlinks, IP addresses, and/or other items which might be considered browser-executable codes. These items are included in the disclosure for their own sake to help describe some embodiments, rather than being included to reference the contents of the web sites or files that they identify. Applicants do not intend to have any URLs, hyperlinks, IP addresses, or other such codes be active links. None of these items are intended to serve as an incorporation by reference of material that is located outside this disclosure document. Thus, there should be no objection to the inclusion of these items herein. To the extent these items are not already disabled, it is presumed the Patent Office will disable them (render them inactive as links) when preparing this document's text to be loaded onto its official web database. See, e.g., United States Patent and Trademark Manual of Patent Examining Procedure § 608.01 (VII).

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GDPR: General Data Protection Regulation
GPU: graphical processing unit
GUI: graphical user interface
HTTPS: hypertext transfer protocol, secure
IaaS or IAAS: infrastructure-as-a-service
LAN: local area network
OS: operating system
PaaS or PAAS: platform-as-a-service
RAM: random access memory
ROM: read only memory
TPU: tensor processing unit
UEFI: Unified Extensible Firmware Interface
UI: user interface
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Sharing a reference numeral does not mean necessarily sharing every aspect, feature, or limitation of every item referred to using the reference numeral. Omission of a reference numeral from a given piece of text does not necessarily mean that the content of a Figure is not being discussed by the text. The present disclosure asserts and exercises the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smart bands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin (x)) or it may simply return without also providing a value (e.g., void functions).

"Service" means a consumable program offering, in a cloud computing environment or other network or computing system environment, which provides resources to multiple programs or provides resource access to multiple programs, or does both. A service implementation may itself include multiple applications or other programs.

"Cloud" means pooled resources for computing, storage, and networking which are elastically available for measured on-demand service. A cloud 136 may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

Herein, activity by a user refers to activity by a user device or activity by a user account, or by software on behalf of a user, or by hardware on behalf of a user. Activity is represented by digital data or machine operations or both in a computing system. Activity within the scope of any claim based on the present disclosure excludes human actions per se. Software or hardware activity "on behalf of a user" accordingly refers to software or hardware activity on behalf of a user device or on behalf of a user account or on behalf of another computational mechanism or computational artifact, and thus does not bring human behavior per se within the scope of any embodiment or any claim.

"Digital data" means data in a computing system, as opposed to data written on paper or thoughts in a person's mind, for example. Similarly, "digital memory" refers to a non-living device, e.g., computing storage hardware, not to human or other biological memory.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" may also be used as a patent law term of art, e.g., in describing a process claim as opposed to a system claim or an article of manufacture (configured storage medium) claim. Similarly, "method" is used herein primarily as a technical term in the computing science arts (a kind of "routine") but it is also a patent law term of art (akin to a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. DNS security operations such as locating 710, modifying 712, deleting 714, or flushing 514 DNS records, and many other operations discussed herein (whether recited in the Figures or not), are understood to be inherently digital. A human mind cannot interface directly with a CPU or other processor, or with RAM or other digital storage, to read and write the necessary data to perform the DNS securing steps 700 taught herein even in a hypothetical or actual prototype situation, much less in an embodiment's real world large computing environment. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/ or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user, and indicates machine activity rather than human activity. Indeed, a user may not even realize that a proactive step by an embodiment was possible until a result of the step has been presented to the user. Except as otherwise stated, any computational and/or automatic step described herein may also be done proactively.

"Based on" means based on at least, not based exclusively on. Thus, a calculation based on X depends on at least X, and may also depend on Y.

Throughout this document, use of the optional plural "(s)", "(es)", or "(ies)" means that one or more of the indicated features is present. For example, "processor(s)" means "one or more processors" or equivalently "at least one processor".

"At least one" of a list of items means one of the items, or two of the items, or three of the items, and so on up to and including all N of the items, where the list is a list of N items. The presence of an item in the list does not require the presence of the item (or a check for the item) in an embodiment. For instance, if an embodiment of a system is described herein as including at least one of A, B, C, or D, then a system that includes A but does not check for B or C or D is an embodiment, and so is a system that includes A and also includes B but does not include or check for C or D. Similar understandings pertain to items which are steps or step portions or options in a method embodiment. This is not a complete list of all possibilities; it is provided merely to aid understanding of the scope of "at least one" that is intended herein.

For the purposes of United States law and practice, use of the word "step" herein, in the claims or elsewhere, is not intended to invoke means-plus-function, step-plus-function, or 35 United State Code Section 112 Sixth Paragraph/ Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this disclosure discusses various data values and data structures, and recognize that such items reside in a memory (RAM, disk, etc.), thereby configuring the memory. One of skill will also recognize that this disclosure discusses various algorithmic steps which are to be embodied in executable code in a given implementation, and that such code also resides in memory, and that it effectively configures any general-purpose processor which executes it, thereby transforming it from a general-purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a computational step on behalf of a party of interest, such as accessing, adding, allowing, ascertaining, assessing, barring, caching, checking, choosing, confirming, deleting, detecting, determining, discerning, enforcing, flushing, getting, intercepting, locating, modifying, notifying, permitting, preventing, providing, reading, receiving, requesting, resolving, responding, securing, selecting, sending (and accesses, accessed, adds, added, etc.) with regard to a destination or other subject may involve intervening action, such as the foregoing or such as forwarding, copying, uploading, downloading, encoding, decoding, compressing, decompressing, encrypting, decrypting, authenticating, invoking, and so on by some other party or mechanism, including any action recited in this document, yet still be understood as being performed directly by or on behalf of the party of interest. Example verbs listed here may overlap in meaning or even be synonyms; separate verb names do not dictate separate functionality in every case.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other storage device or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory and computer readable storage devices are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe aspects of embodiments by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment; includes one or more systems 102

101 machine in a system 102, e.g., any device having at least a processor 110 and a memory 112 and also having a distinct identifier such as an IP address or a MAC (media access control) address; may be a physical machine or be a virtual machine or a container implemented on physical hardware

102 computer system, also referred to as a "computational system" or "computing system", and when in a network may be referred to as a "node"

104 users, e.g., user of an enhanced system 202

106 peripheral device

108 network generally, including, e.g., LANs, WANs, software-defined networks, clouds, and other wired or wireless networks

110 processor or set of processors; includes hardware

112 computer-readable storage medium, e.g., RAM, hard disks

114 removable configured computer-readable storage medium

116 instructions executable with processor; may be on removable storage media or in other memory (volatile or nonvolatile or both)

118 digital data in a system 102; data structures, values, source code, and other examples are discussed herein

120 kernel(s), e.g., operating system(s), BIOS, UEFI, device drivers; also refers to an execution engine such as a language runtime

122 software tools, software applications, security controls; computational

124 user account identity, also referred to as user identity; digital identification of a user account; in some embodiments and scenarios, an application 502 is effectively a user and thus the application has a user identity 124

126 display screens, also referred to as "displays"

128 computing hardware not otherwise associated with a reference number 106, 108, 110, 112, 114

130 device identity; digital identification of a device 101 or system 102

132 domain name, as represented in a computing system, e.g., a hostname or an FQDN or a string having a syntax such as the syntax illustrated by "contoso.com", "abc-.foobar.org", etc.

134 domain name operation in a computing system, e.g., resolution request or response thereto; a proper subset of DNS operations 220 in some embodiments

136 cloud, also referred to as cloud environment or cloud computing environment

202 enhanced computing system, i.e., system 102 enhanced with functionality 204 as taught herein

204 DNS operations security functionality (also referred to as "DNS operation security functionality", "functionality 204", includes secure DNS resolution functionality 204), e.g., software or specialized hardware which performs or is configured to perform step 606 as part of a DNS resolution 214, or steps 602 and 606 with respect to a DNS operation 220, or steps 604 and 606 with respect to a DNS operation 220, or steps 722 and 606 with respect to a DNS operation 220, or steps 734 and 606 with respect to a DNS operation 220, or steps 736 and 606 with respect to a DNS operation 220, or steps 716 and 740 with respect to a DNS operation 220, or any software or hardware which performs or is configured to perform a novel method 700 or a computational DNS operation security functionality activity first disclosed herein

206 computationally secure a DNS operation, e.g., by executing functionality 204

208 security policy, as represented in a computing system, e.g., data structure(s) implementing conditions 318 and corresponding access request responses

210 domain name system (DNS) generally; computational

212 domain name system record, as represented in a computing system, e.g., an A, AAAA, CNAME, PTR, NS, MX, SOA, or TXT record; records referencing or containing a domain name 132 are domain name records 212

214 domain name resolution; computational activity to resolve a domain name to an IP address, or a result thereof, which includes an IP address or an error code

216 IP address, as represented in a computing system; IPv4 or IPv6 218 DNS cache in a computing system; computational and includes memory 112 designed for caching DNS record(s)

220 DNS operation, as represented in a computing system; computational, digital, e.g., an operation such as domain name resolution, reverse lookup from IP address to domain name, read/write to a DNS record, or associated traffic; includes any operation in a computing system that does or attempts to do any of the following: access a domain name server, access a DNS record, or receive a communication from a domain name server

302 DNS security software, e.g., operations security assistant, conditional access engine, client agent, driver, device identifier software, policy enforcement, or other software which upon execution performs a method 700 in a computing system

304 set of IP addresses, as represented in a computing system

306 security risk or vulnerability, as represented in a computing system, e.g., a risk category, a risk threat

308 risk score a.k.a. risk assessment, as represented in a computing system; a quantification of risk; in some embodiments and scenarios a risk score is dynamically calculated, while in others the risk score is directly included within either a token 312 or a device health certificate

310 DNS request, as represented in a computing system; computational activity or digital data or both

312 authentication token, as represented in a computing system; in some systems authentication tokens optionally include what are called "claims" (not to be confused with patent claims) which are assertions made by the IDP about the identity; claims are often strongly associated with the token by being part of the verifiable data (digitally signed and/or encrypted by the IDP; some examples of token 312 claims include: identification of a device health certificate accepted as valid by the IDP (certificate is identified by a hash in some cases, and in some cases includes a full certificate), a risk score associated with the user by the IDP at the time of the token issuance, the user identity 124 although in some embodiments the user identity is not stored in (or is not retrieved from) a token, the device identity 130 although in some embodiments the device identity is not stored in (or is not retrieved from) a token, or membership in a security group or in a role (for role based access control a.k.a. RBAC)

314 health of a device or other computing system, as represented in a computing system, e.g., criteria or threshold indicating health or lack of health

316 health status a.k.a. health data, e.g., healthy, not healthy, unknown, as represented in a computing system

318 security policy condition, e.g., conditions to be satisfied before access is granted per a policy 208; as represented in a computing system

320 interface generally in a computing system; computational, digital

402 potential resolution of domain name, i.e., an IP address associated with the domain name in a DNS record as a resolution; digital

404 identify provider (IDP), e.g., directory service, identity service, e.g., Azure® Active Directory® service (marks of Microsoft Corporation) or an LDAP (lightweight directory access protocol) service

406 subset, a part or all of a set; may be all of a set unless described as a proper subset; may be empty unless described as non-empty

408 notification, as represented in a computing system

410 time-to-live, as represented in a computing system

412 response tier, as represented in a computing system, e.g., some embodiments includes tiers designated non-compliant, high-risk, medium-risk, and low-risk scores, with each of the foregoing mapped to a distinct selection of IP address results

414 access requirement, as represented in a computing system

416 network protocol security according to characteristics or levels, rather than utilizing a simple secure/not secure categorization, thereby supporting policy 208 definitions of secure network protocols 416 which distinguish, e.g., HTTP from HTTPS using SSL2 (secure sockets layer version 2) from HTTPS using TLS, distinguish SFTP (secure file transfer protocol) from FTP, and distinguish Exchange® ActiveSync from POP (post office protocol), for example (mark of Microsoft Corporation)

418 forwarding operation, as represented in a computing system

420 redirection operation, as represented in a computing system

422 result of a DNS operation, e.g., IP address, domain name, error code, status code, as represented in a computing system; also referred to as a response to a request

424 managed device, e.g., device 101 configured and managed by an enterprise information technology (IT) department

426 public server, e.g., internet-accessible server, or characteristic of being on a public network as opposed to being on a private network

428 private server, e.g., not an internet-accessible server, or characteristic of being on a private network as opposed to being on a public network

430 DNS server

432 security group, as represented in a computing system

434 security role, as represented in a computing sys

436 digital ID of a security group or a security role

438 authentication lifetime, as represented in a computing system; may be stored in an authentication token or in another data structure

440 security characteristic, as represented in a computing system, e.g., encryption generally or a particular encryption algorithm or an encryption key size minimum, logging, or compliance with a industry standard or compliance with a governmental standard or governmental regulation

442 security level, as represented in a computing system, e.g., public, confidential, top secret

444 security heartbeat, as represented in a computing system

446 anomaly in an security heartbeat, as represented in a computing system, e.g., lack of heartbeat for a specified time, failure of authentication of heartbeat

448 endorsement of an operation or data, e.g., indication that the operation or data is valid, authentic, authorized, current, or a combination thereof, e.g., a certificate, a hash, an authentication token, or a timestamp

500 data flow diagram; 500 also refers to systems and methods that are illustrated by or consistent with the FIG. 5 data flow diagram or any variation of the FIG. 5 data flow diagram described herein

502 application program, in a computing system

504 DNS resolver software, in a computing system

508 refusal of DNS request 310; an example of a response 422

510 requested result of a DNS request 310; an example of a response 422

512 not requested result 510 but also not flat refusal 508; an example of a response 422

514 computational activity of flushing DNS record(s) from cache 218, or result thereof in a computing system

516 conditional access security control or other conditional access security tool; 516 also refers to conditional access as a characteristic of access control

600 flowchart; 600 also refers to DNS security methods that are illustrated by or consistent with the FIG. 6 flowchart or any variation of the FIG. 6 flowchart described herein

602 computationally determine a device identity, e.g., via a kernel API or a command such as ispci or devmgmt

604 computationally ascertain a user account identity, e.g., via an authentication token, a kernel API, or a file such as an etc/passwd file

606 computationally enforce a security policy 208, e.g., by allowing or limiting access based on an identity and the policy, in a computing system

700 flowchart; 700 also refers to DNS security methods that are illustrated by or consistent with the FIG. 7 flowchart, which incorporates the FIG. 6 flowchart and steps shown by the FIG. 5 data flow diagram and other steps taught herein, or methods that are illustrated by or consistent with any variation of the FIG. 7 flowchart described herein

702 computationally prevent a requested result

704 computationally permit a requested result or permit progress toward a requested result

706 computationally bar a requested result or bar progress toward a requested result

708 computationally allow a different result than the requested result while barring the requested result

710 computationally locate a DNS record, e.g., by querying a DNS server, or using a lookup tool such as nslookup or dig

712 computationally modify a DNS record, e.g., by setting a value in the DNS record

714 computationally delete a DNS record, e.g., via a DNS server API, or a tool invocation such as ipconfig /flushdns, or by overwriting memory occupied by the DNS record

716 computationally assess a risk, e.g., by reading or calculating a risk score, or by invoking a risk assessment portion of a conditional access control

718 computationally select an IP address set or an individual IP address, e.g., per a table, a switch statement, or another selection operator that maps risk levels to IP addresses

720 computationally provide a selected IP address, e.g., by placing it in a response 422

722 computationally check a device for compliance with a policy, e.g., via APIs

724 computationally read an authentication token

726 computationally receive a notification, e.g., via an API

728 computationally discern whether a policy condition is satisfied, e.g., via APIs

730 satisfaction of a policy condition, as represented in a computing system

732 computationally add an access requirement, e.g., by modifying a security control setting or a policy condition

734 computationally get a security group ID, e.g., via an API

736 computationally get a security role ID, e.g., via an API

738 computationally detect a security heartbeat anomaly, e.g., via a statistical analysis or a machine learning model result

740 computationally choose a response tier, e.g., based on how many or which (or both) policy conditions are satisfied for a given user or a given device or a given user-device combination

742 computationally confirm that an authentication lifetime will not be exceeded by a DNS TTL, e.g., by shortening the TTL to match the lifetime

744 computationally intercept a DNS operation, e.g., by scanning traffic for a packet representing the DNS operation

746 any step or item discussed in the present disclosure that has not been assigned some other reference numeral; 746 may thus be shown expressly as a reference numeral for various steps or items or both, and may be added as a reference numeral (in the current disclosure or any subsequent patent application which claims priority to the current disclosure) for various steps or items or both without thereby adding new matter

748 computationally remove an access requirement, e.g., by modifying a security control setting or a policy condition

CONCLUSION

Some embodiments enhance the security 206 of domain name resolution 214 and other DNS operations 220, by automatically intercepting 744 the DNS operation, determining 602 an associated device identity 130 or ascertaining 604 an associated user identity 124, and enforcing 606 a security policy 208 based on at least the DNS operation 220 and based on at least one of the identities 124, 130. Some securable DNS operations 220 include resolution requests 134, reverse lookups from IP addresses 216 to domain names 132, DNS record 212 accesses, mail server mappings, redirection 420, forwarding 418, and DNS record cache 218 operations. Enforcing 606 the policy 208 includes, e.g., preventing 702 a result 422 requested 310 by the DNS operation 220, permitting 704 computational progress toward the requested result, allowing 708 a different result 422, modifying 712 a DNS record 212, or flushing 514 a DNS record 212 from a cache 218. In some embodiments, DNS operation security functionality 204 utilizes or implements a conditional access 516 security functionality 302, thereby providing, e.g., a secure conditional domain name resolution.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with the Figures also help describe configured storage media, and help describe the technical effects and operation of systems and manufactures like those discussed in connection with other Figures. It does not follow that any limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of platforms or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification. The abstract is provided for convenience and for compliance with patent office requirements; it is not a substitute for the claims and does not govern claim interpretation in the event of any apparent conflict with other parts of the specification. Similarly, the summary is provided for convenience and does not govern in the event of any conflict with the claims or with other parts of the specification. Claim interpretation shall be made in view of the specification as understood by one of skill in the art; it is not required to recite every nuance within the claims themselves as though no other disclosure was provided herein.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A method of securing domain name system operations, the method comprising:
   automatically intercepting a domain name system operation;
   determining a device identity associated with the domain name system operation;
   ascertaining a user identity associated with the domain name system operation;
   reading an authentication token associated with the user identity, the authentication token issued by an identity provider;
   locating a domain name record associated with a domain name of the domain name system operation;
   enforcing a security policy based on the domain name system operation and at least one of the device identity or the user identity, wherein enforcing the security policy comprises;
      modifying a response to the domain name system operation based on at least one of the device identity or the user identity; and
      confirming that a time-to-live specified in the domain name record does not exceed a lifetime of the authentication token,
      wherein modifying the response comprises performing at least one of:
         allowing a different result than the result requested by the domain name system operation;
         modifying a domain name system record; or
         flushing at least a portion of a cache containing at least one domain name record.

2. The method of claim 1, wherein the domain name system operation includes or is part of a domain name resolution request for the domain name, and wherein enforcing the security policy comprises:
   assessing a domain name resolution risk based on at least the security policy and based on at least one of: the user identity, or the device identity;
   selecting an IP address from a set of IP addresses which are identified in a set of domain name system records as potential resolutions of the domain name, the selecting based on at least a result of the assessing; and
   providing the selected IP address in response to the domain name resolution request.

3. The method of claim 1, wherein enforcing the security policy based on the domain name system operation and at least one of the device identity or the user identity further comprises:
   checking whether the device is compliant with a specified device security policy; and
   preventing the result requested by the domain name system operation when the device is not compliant with the specified device security policy.

4. The method of claim 1, wherein enforcing the security policy based on the domain name system operation and at least one of the device identity or the user identity further comprises:

enforcing the security policy based on at least the authentication token.

5. The method of claim 1, further comprising:

receiving a notification of a change in a health status of the device;

in response to receiving the notification, performing at least one of: setting the time-to-live in the domain name record, deleting the domain name record, or flushing at least a portion of a domain name record cache.

6. The method of claim 1, further comprising:

receiving a notification of a change in a risk score associated with the device or a risk score associated with the user identity, or both;

in response to receiving the notification, performing at least one of: setting the time-to-live in the domain name record, deleting the domain name record, or flushing at least a portion of a domain name record cache.

7. The method of claim 1, wherein:

the domain name system operation requests a particular result; and enforcing the security policy based on the name system operation and at least one of the device identity or the user identity further comprises:

discerning that a non-empty proper subset of a set of conditions specified by the security policy is satisfied, wherein the security policy specifies that all of the conditions be satisfied in order to permit the particular result; and in response to the discerning, barring a portion but not all of the particular result, or barring a portion but not all progress toward a less risky result which is designated as less risky than the particular result.

8. The method of claim 1, wherein enforcing the security policy based on the name system operation and at least one of the device identity or the user identity further comprises:

assessing a risk based on at least the security policy and based on at least one of the user identity or the device identity, and wherein enforcing the security policy further comprises performing at least one of the following in response to a result of the assessing:

adding an access requirement specifying that a network protocol with a specified security characteristic or a specified security level, or both, be utilized for a network communication which includes the intercepted domain name system operation;

adding an access requirement specifying that a network protocol with a specified security characteristic or a specified security level, or both, be utilized for a network communication which responds to the intercepted domain name system operation;

adding an access requirement that prohibits use of a network protocol with a specified security characteristic or a specified security level, or both;

adding an access requirement that prohibits forwarding the intercepted domain name system operation to a public domain name system server; or adding an access requirement that prohibits redirecting the intercepted domain name system operation to a public domain name system server.

9. A computing system which is configured to assist in securing domain name system operations, the computing system comprising:

a digital memory;

a processor set comprising at least one processor, the processor set in operable communication with the digital memory;

a domain name system operations security assistant which is configured to, upon execution by the processor set;

automatically intercept a domain name system operation;

determine a device identity associated with the domain name system operation or ascertain a user identity associated with the domain name system operation;

read an authentication token associated with the user identity, the authentication token issued by an identity provider;

locate a domain name record associated with a domain name of the domain name system operation;

enforce a security policy based on the domain name system operation and at least one of the device identity or the user identity, wherein enforcing the security policy comprises:

modifying a response to the domain system operation based on at least of the device identity or the user identity; and confirming that a time-to-live specified in the domain name record does not exceed a lifetime of the authentication token, wherein modifying the response comprises performing at least one of:

allowing a different result than the result requested by the domain name system operation;

modifying a domain name system record; or flushing at least a portion of a cache containing at least one domain name record.

10. The computing system of claim 9, wherein the domain name system operations security assistant is configured to, upon execution by the processor set:

check whether the device is enrolled as a managed device; and prevent the result requested by the domain name system operation when the device is not enrolled as a managed device.

11. The computing system of claim 9, wherein the domain name system operation includes or is part of a domain name resolution request for the domain name.

12. The computing system of claim 9, wherein the domain name system operations security assistant is configured to, upon execution by the processor set:

get a security group identification which identifies a security group, the user identity being a member of the security group; and base the enforcing on at least the security group identification.

13. The computing system of claim 9, wherein the domain name system operations security assistant is configured to, upon execution by the processor set:

get a security role identification which identifies a security role, the user identity being a holder of the security role; and base the enforcing on at least the security role identification.

14. The computing system of claim 9, wherein the domain name system operations security assistant is configured to, upon execution by the processor set:

detect a security heartbeat anomaly; and in response to detecting the security heartbeat anomaly, flush at least a portion of a domain name record cache.

15. The computing system of claim 9, wherein the domain name system operations security assistant is configured to, upon execution by the processor set:

add an access requirement that prohibits forwarding the intercepted domain name system operation to a public domain name system server; or add an access requirement that prohibits redirecting the intercepted domain name system operation to a public domain name system server.

16. A computer-readable storage device configured with data and instructions which upon execution by a processor cause a computing system to perform a method of securing domain name system operations, the method comprising:

automatically intercepting a domain name system operation;

determining at least one of a device identity associated with the domain name system operation or a user identity associated with the domain name system operation; and reading an authentication token associated with the user identity, the authentication token issued by an identity provider;

locating a domain name record associated with a domain name of the domain name system operation;

enforcing a security policy based on the domain name system operation and at least one of the device identity or the user identity, wherein enforcing the security policy comprises:

modifying a response to the domain name system operation based on at least one of the device identity or the user identity; and confirming that a time-to-live specified in the domain name record does not exceed a lifetime of the authentication token, wherein modifying the response comprises performing at least one of:

allowing a different result than the result requested by the domain name system operation;

modifying a domain name system record; or flushing at least a portion of a cache containing at least one domain name record.

17. The computer-readable storage device of claim 16, wherein the automatically intercepting occurs on the device, and enforcing the security policy also occurs at least partially on the device.

18. The computer-readable storage device of claim 16, wherein the domain name system operation includes or is part of a domain name resolution request for the domain name, and wherein enforcing the security policy comprises:

assessing a domain name resolution risk based on at least the security policy and based on at least one of: the user identity, or the device identity;

choosing a response tier from a set of response tiers, the choosing based on at least a result of the assessing;

selecting an IP address from a set of one or more IP addresses which correspond to the response tier, the selected IP address corresponding to exactly one of the response tiers, the selected IP address identified in a set of domain name system records as a potential resolution of the domain name; and providing the selected IP address in response to the domain name resolution request.

19. The computer-readable storage device of claim 18, wherein the set of response tiers comprises at least three tiers, each tier having a respective selectable IP address which is distinct from all selectable IP addresses of the other tiers.

20. The computer-readable storage device of claim 16, wherein the domain name system operation includes or is part of a domain name resolution request for the domain name, and wherein enforcing the security policy comprises:

assessing a domain name resolution risk based on at least the security policy and based on at least one of: the user identity, or the device identity;

selecting an IP address set from a collection of IP address sets, each IP address set of the collection including one or more IP addresses which are identified in one or more domain name system records as potential resolutions of the domain name, the selecting based on at least a result of the assessing; and providing an IP address of the selected IP address set in response to the domain name resolution request.

\* \* \* \* \*